(12) United States Patent
Wada et al.

(10) Patent No.: US 8,285,742 B2
(45) Date of Patent: Oct. 9, 2012

(54) MANAGEMENT OF ATTRIBUTE INFORMATION RELATED TO SYSTEM RESOURCES

(75) Inventors: Yuji Wada, Kawasaki (JP); Masazumi Matsubara, Kawasaki (JP); Kenji Morimoto, Tokyo (JP); Akira Katsuno, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/964,133

(22) Filed: Dec. 9, 2010

(65) Prior Publication Data
US 2011/0302199 A1 Dec. 8, 2011

Related U.S. Application Data

(63) Continuation of application No. PCT/JP2008/060827, filed on Jun. 13, 2008.

(51) Int. Cl.
G06F 17/30 (2006.01)
(52) U.S. Cl. ...................................... 707/769
(58) Field of Classification Search .......... 707/610–613, 707/624, 769
See application file for complete search history.

(56) References Cited

U.S. PATENT DOCUMENTS
2007/0294672 A1 12/2007 Mosuoka
2008/0281833 A1* 11/2008 Cain et al. ..................... 707/100

FOREIGN PATENT DOCUMENTS
JP 2005-258501 9/2005
JP 2007-334580 12/2007

OTHER PUBLICATIONS

Implementing Relationships and constraint in an object-oriented database using a monitor construct, Michael Doherty, Joan Peckham, Victor Fay Wolfe, IEEE, 1993.*
International Search Report issued in International Application No. PCT/JP2008/060827, mailed Sep. 16, 2008.
Kenji Watanabe et al.; "A to Z ITIL (IT Infrastructure Library)"; Nikkei Computer, Nikkei Business Publications Inc.; May 30, 2005; vol. 327, p. 214-217, p. 216 right col., lines 17-25.
International Preliminary Report on Patentability issued in International Application No. PCT/JP2008/060827, issued Jan. 11, 2011.

* cited by examiner

Primary Examiner — Kimberly Wilson
Assistant Examiner — Hua H Hoang
(74) Attorney, Agent, or Firm — Greer, Burns & Crain, Ltd.

(57) ABSTRACT

An information processing apparatus that manages resource information which is information related to resources constituting a system, includes: a first condition setting section that sets first conditions which are predetermined conditions between given resource information and other resource information; a first condition extraction section that extracts, from the first conditions set by the first condition setting section, a first condition set to resource information, on which changed information that is information indicating a change to the resource information is based; and a first condition determination section that determines whether the changed information satisfies the first condition extracted by the first condition extraction section.

20 Claims, 23 Drawing Sheets

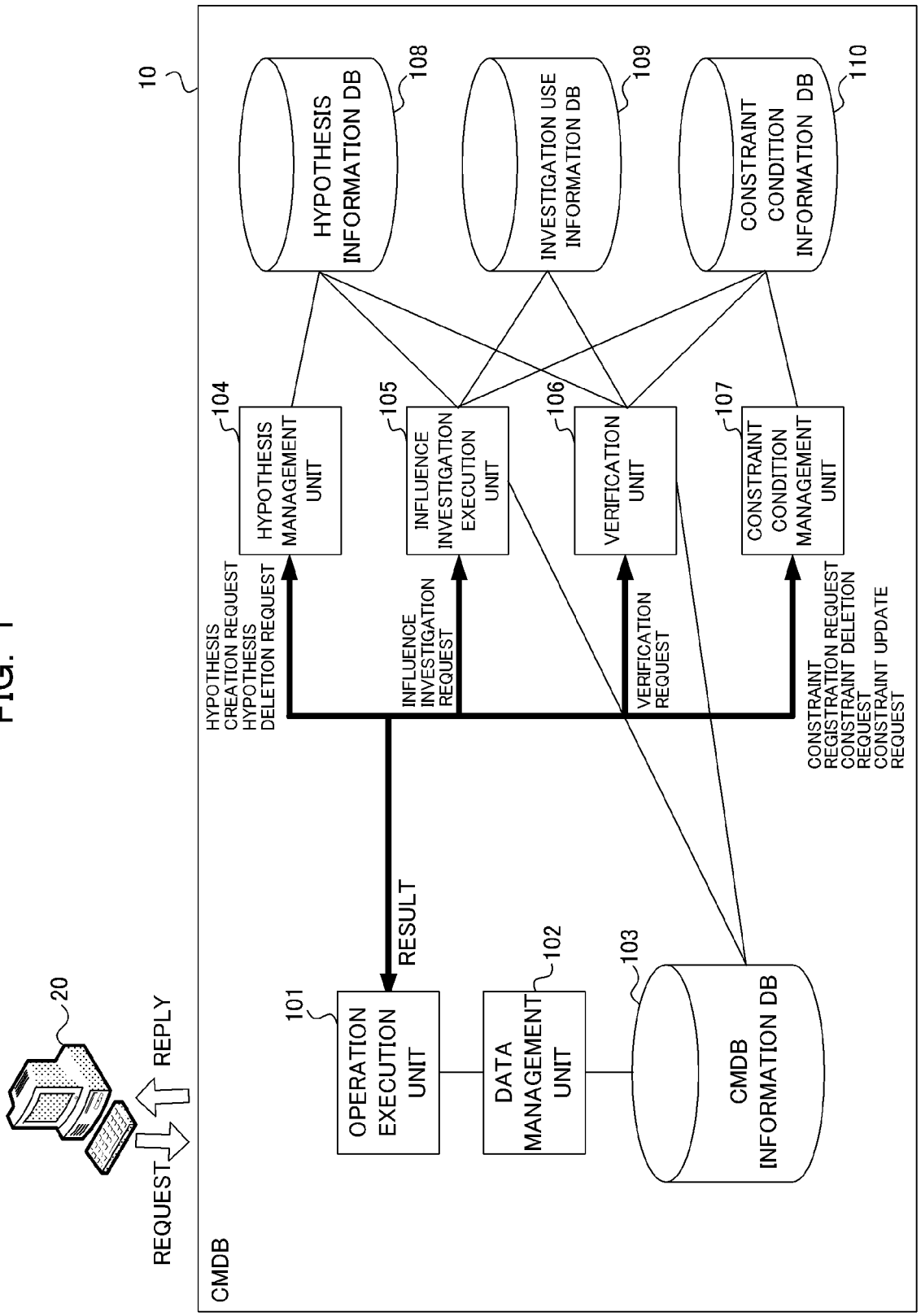

FIG.2

| HYPOTHESIS INFORMATION ||||
| HYPOTHESIS ID | HYPOTHESIS CONDITION INFORMATION | RELATED Entity | RELIABILITY |
| --- | --- | --- | --- |
| ... | ... | ... | ... |
| Hyp10 | CHANGE SIMULTANEOUSLY | COMPUTER1,HDD1, HDD2 | 50 |
| Hyp11 | HDD@COMPUTER1 > CAPACITY @HDD11 | COMPUTER1,HDD11 | 10 |
| Hyp12 | HDD@COMPUTER1 > CAPACITY@HDD12 | COMPUTER2,HDD12 | 10 |
| Hyp13 | CHANGE SIMULTANEOUSLY | COMPUTER2,HDD21, HDD22 | 50 |
| ... | ... | ... | ... |

FIG.3

| CONSTRAINT CONDITION INFORMATION ||||
| CONSTRAINT CONDITION ID | CONSTRAINT CONDITION EXPRESSION | RELATED Entity | RELIABILITY |
| --- | --- | --- | --- |
| ... | ... | ... | ... |
| Cnd1 | CAPACITY@HDD11 +CAPACITY@HDD12 =HDD@COMPUTER1 | COMPUTER1, HDD11, HDD12 | 100 |
| Cnd2 | includes(TARGET OS@ APPLICATION11, OS@COMPUTER1) =true | COMPUTER1, APPLICATION11 | 100 |
| Cnd3 | HDD@source >=CAPACITY@target | relationship | 80 |
| Cnd I | newer(updateTime(HDD11), updateTime(COMPUTER1)) =true | COMPUTER1, HDD11, | 80 |
| Cnd i+1 | coexists(DESIGN INFORMATION @entity, REAL MACHINE INFORMATION@entity) =true | CI | 90 |
| Cnd i+2 | sum(CAPACITY@target) =HDD@source | relationship | 80 |
| ... | ... | ... | ... |

FIG.4

| INVESTIGATION USE INFORMATION |||
|---|---|---|
| INVESTIGATION ID | UNSATISFIABLE CONSTRAINT CONDITION | UNSATISFIABLE HYPOTHESIS |
| ... | ... | ... |
| INVESTIGATION1 | Cnd100 | Hyp101 |
| INVESTIGATION10 | Cnd1,Cnd3 | Hyp10,Hyp11,Hyp13 |
| ... | ... | ... |

# MANAGEMENT OF ATTRIBUTE INFORMATION RELATED TO SYSTEM RESOURCES

CROSS-REFERENCE TO RELATED APPLICATIONS

This application is a continuation application, filed under 35 U.S.C. §111(a), of PCT Application No. PCT/JP2008/060827, filed Jun. 13, 2008, the disclosure of which is herein incorporated in its entirety by reference.

FIELD

The present invention relates to a resource information managing apparatus, a resource informationord managing program, and a resource information managing method that manage attribute information related to system resources.

BACKGROUND

A CMDB (Configuration Management Database) is known as a database that manages all information related to components of an information system by virtually integrating various kinds of databases for managing information related to hardware/software constituting the information system. As illustrated in FIG. 25, the CMDB enables crossover operation for a plurality of virtually-integrated databases including a configuration information DB, an incident information DB, a trouble information DB, a release information DB, a change information DB, and an application information DB. Each of the above integrated databases manages CI (Configuration Item) which is attribute information related to resources (device, software, etc.) constituting a system and Relationship between information.

As illustrated in FIG. 26, the CMDB has a reconciliation function of arbitrating information by unifying the names of information on the same item which are managed with different names and different local IDs by individual virtually-integrated databases and by managing the information with a unique ID that can be used in common by all the virtually-integrated databases.

The Relationship which is information indicating a relationship between CIs, as illustrated in FIG. 27, retains attribute information including source and target for indicating the direction of the Relationship between CIs.

In the above CMDB, influence investigation that previously investigates a range affected by update is conducted before update of the setting of system resources. The influence investigation is processing that investigates resources related to a resource to be updated while searching for information managed in the CMDB. This processing is performed on the assumption that one CI associated with another CI to be updated is affected by update and follows Relationship from CI to thereby investigate the influence range.

As a prior art relating to the present invention, there is known a failure influence range analyzing system and a failure influence range analyzing method and program that specify a task influence for system failure occurring in a task system implemented on a network (refer to, e.g., Patent Document 1).

[Patent Document 1] Japanese Laid-open Patent Publication No. 2005-258501

However, the influence investigation in the conventional CMDB has a problem of poor accuracy and efficiency. This problem is caused by a fact that the influence investigation is performed on the assumption that one CI associated with another CI to be updated is affected by change as described above.

Poor accuracy in the influence investigation is a problem caused by a fact that the CMDB presumes that a CI that is supposed not to be affected by update will be affected. Further, poor efficiency in the influence investigation is caused by the following reason. That is, the CMDB is configured to perform calculation for all the CIs associated by Relationship, including CIs that are not affected by update, resulting in an increase in the calculation amount related to the influence investigation, which degrades the efficiency.

SUMMARY

According to an aspect of the invention, a resource information managing apparatus that manages resource information which is information related to resources constituting a system, includes: a first condition setting section that sets first conditions which are predetermined conditions between given resource information and other resource information; a first condition extraction section that extracts, from the first conditions set by the first condition setting section, a first condition set to resource information, on which changed information that is information indicating a change to the resource information is based; and a first condition determination section that determines whether the changed information satisfies the first condition extracted by the first condition extraction section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating a configuration of a CMDB according to an embodiment of the present invention;
FIG. 2 is a view illustrating hypothesis information;
FIG. 3 is a view illustrating constraint condition information;
FIG. 4 is a view illustrating investigation use information.

DESCRIPTION OF EMBODIMENT

Figure 5:
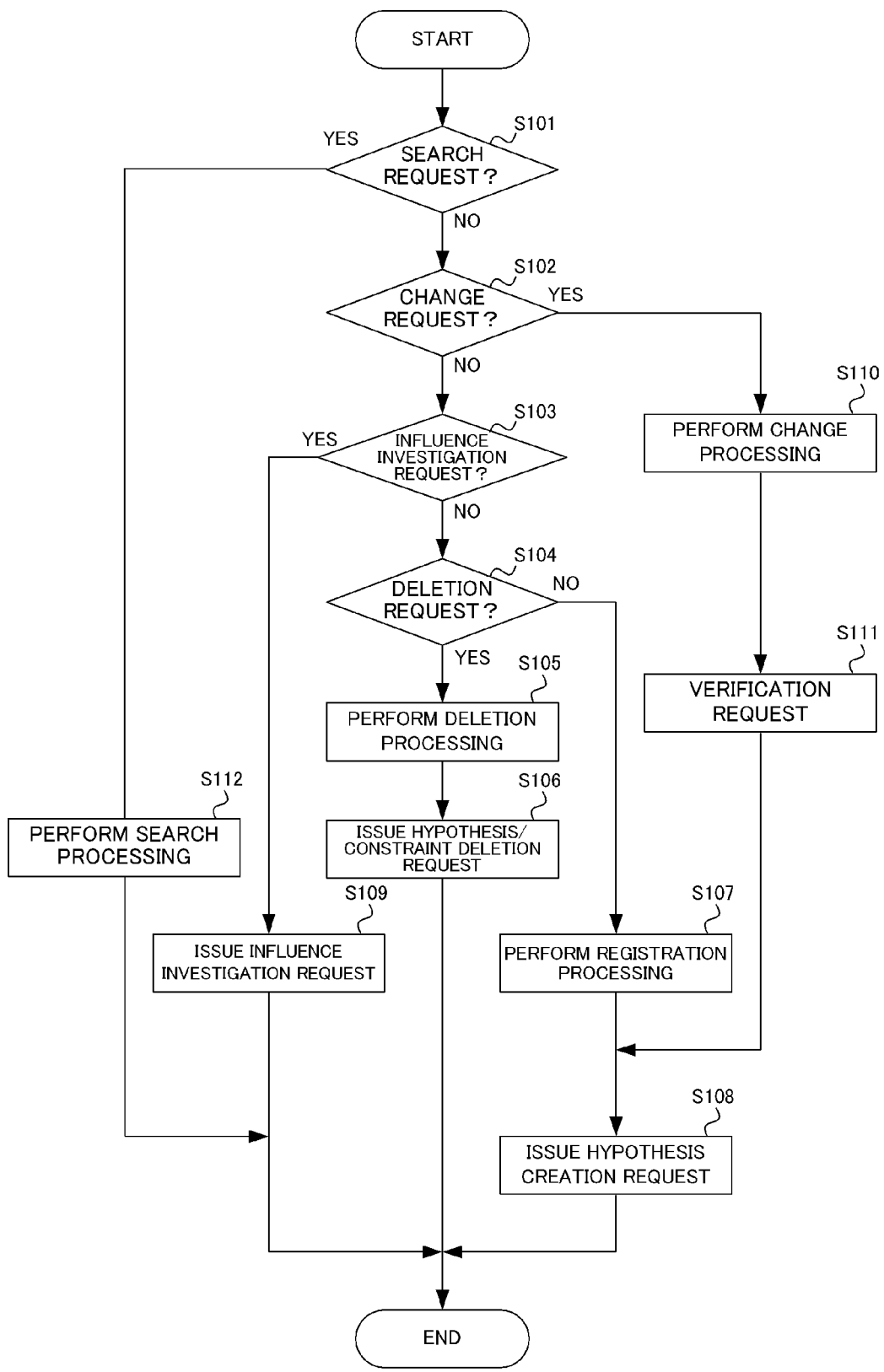
FIG. 5 is a flowchart illustrating operation of an operation execution unit.

The present invention sets dependency in CI and Relationship as a constraint condition in the case where there is any dependency (relationship in which one is affected when another is updated) between CI, between CI and Relationship, or between Relationships. Further, the present invention follows a constraint condition which becomes unsatisfiable by a resource to be updated to find reachable CI and Relationship. Furthermore, the present invention sets a hypothesis in CI and Relationship as a tentative constraint condition. Hereinafter, an embodiment of the present invention will be described with reference to the accompanying drawings.

First, a configuration of a CMDB (resource information managing apparatus) according to the present embodiment will be described. FIG. 1 is a block diagram illustrating a configuration of the CMDB according to the present embodiment. FIG. 2 is a view illustrating hypothesis information. FIG. 3 is a view illustrating constraint condition information. FIG. 4 is a view illustrating investigation use information.

As illustrated in FIG. 1, a CMDB 10 according to the present embodiment includes an operation execution unit 101, a data management unit 102, a CMDB information DB 103, a hypothesis management unit 104 (second condition setting section), an influence investigation execution unit 105 (first condition extraction section, second condition extraction section, first condition determination section, second condition determination section), a verification unit 106 (addition section, first subtraction section, second subtraction section, first condition change section, second condition change section, deletion section), a constraint condition management unit 107 (first condition setting section), a hypothesis information DB 108, an investigation use information DB 109, and a constraint condition information DB 110. The CMDB 10 receives a request issued from a connected client terminal 20 and returns information (resource information) related to system resources as a replay.

The operation execution unit 101 of the CMDB 10 receives a request issued from the client terminal 20 and requires the hypothesis management unit 104, influence investigation execution unit 105, verification unit 106, and constraint condition management unit 107 to execute processing corresponding to the request. The data management unit 102 manages the CMDB information DB 103. The CMDB information DB 103 stores CI and Relationship. The hypothesis management unit 104 manages the hypothesis information DB 108. The influence investigation execution unit 105 registers a constraint condition and a hypothesis which become unsatisfiable when the CI of the system resource is updated in the investigation use information DB 109. The verification unit 106 increases/decreases the reliability (to be described later) of the hypothesis and constraint condition. According to the reliability, the verification unit 106 upgrades a hypothesis to a constraint condition and downgrades a constraint condition to a hypothesis. The constraint condition management unit 107 manages the constraint condition information DB 110.

The hypothesis information DB 108 stores the hypothesis information. As illustrated in FIG. 2, the hypothesis information is information in which "hypothesis ID" indicating a specific hypothesis, "hypothesis condition expression (second condition)" indicating a condition expression of the hypothesis, "related Entity" which is an Entity (general term of CI and Relationship) related to the hypothesis, and "reliability" which is a value indicating how much the hypothesis is trusted are associated with one another.

The constraint condition information DB 110 stores constraint condition information. As illustrated in FIG. 3, the constraint condition information is information in which "constraint condition ID" indicating a specific constraint condition, "constraint condition expression (first condition)" indicating a condition expression of the constraint condition, "related Entity" which is an Entity related to the constraint condition, and "reliability" which is a value indicating how much the constraint condition is trusted are associated with one another.

The investigation use information DB 109 stores investigation use information. As illustrated in FIG. 4, the investigation use information is information in which "investigation ID" which is an ID generated in response to an influence investigation request, "unsatisfiable constraint condition" indicating an ID of a constrain condition which is unsatisfiable in the influence investigation, and "unsatisfiable hypothesis" indicating an ID of a hypothesis which is unsatisfiable in the influence investigation are associated with one another.

Operation of the CMDB according to the present embodiment will be described. First, among the operations of the CMDB, operation of the operation execution unit will be described. FIG. 5 is a flowchart illustrating operation of the operation execution unit. In FIG. 5, it is assumed that a processing request has already been issued from the client terminal.

The operation execution unit 101 determines whether a request issued from the client terminal 20 is a search request (S101).

In the case where the request issued from the client terminal 20 is not a search request (NO in S101), the operation execution unit 101 determines whether the request issued from the client terminal 20 is a change request (S102).

In the case where the request issued from the client terminal 20 is not a change request (NO in S102), the operation execution unit 101 determines whether the request issued from the client terminal 20 is an influence investigation request (S103).

In the case where the request issued from the client terminal 20 is not an influence investigation request (NO in S103), the operation execution unit 101 determines whether the request issued from the client terminal 20 is a deletion request (S104).

In the case where the request issued from the client terminal 20 is a deletion request (YES in S104), the operation execution unit 101 deletes information related to a resource specified in the deletion request from the CMDB information DB 103 through the data management unit 102 (S105). Further, the operation execution unit 101 issues a hypothesis deletion request and a constraint deletion request to the hypothesis management unit 104 and constraint condition management unit 107, respectively (S106).

In the case where the request issued from the client terminal 20 is not a deletion request (NO in S104), the operation execution unit 101 regards the request as a registration request and registers information related to a resource specified in the registration request in the CMDB information DB 103 through the data management unit 102 (S107). Further, the operation execution unit 101 issues a hypothesis generation request to the hypothesis management unit 104 (S108).

In the case where the request issued from the client terminal 20 is an influence investigation request in the determination of step S103 (YES in S103), the operation execution unit 101 issues an influence investigation request to the influence investigation execution unit 105 (S109).

In the case where the request issued from the client terminal 20 is a change request in the determination of step S102 (YES in S102), the operation execution unit 101 changes the Entity in the CMDB information DB 103 through the data management unit 102 (S110). Further, the operation execution unit 101 issues a verification request to the verification unit 106 (S111) and issues a hypothesis generation request to the hypothesis management unit 104 (S108).

In the case where the request issued from the client terminal 20 is a search request in the determination of step S101 (YES in S101), the operation execution unit 101 searches the CMDB information DB through the data management unit 102 based on information related to a resource specified in the search request (S112).

As described above, the operation execution unit 101 requests the hypothesis management unit 104, influence investigation execution unit 105, verification unit 106, and constraint condition management unit 107 to execute the abovementioned processing based on the request issued from the client terminal 20.

Figure 6:
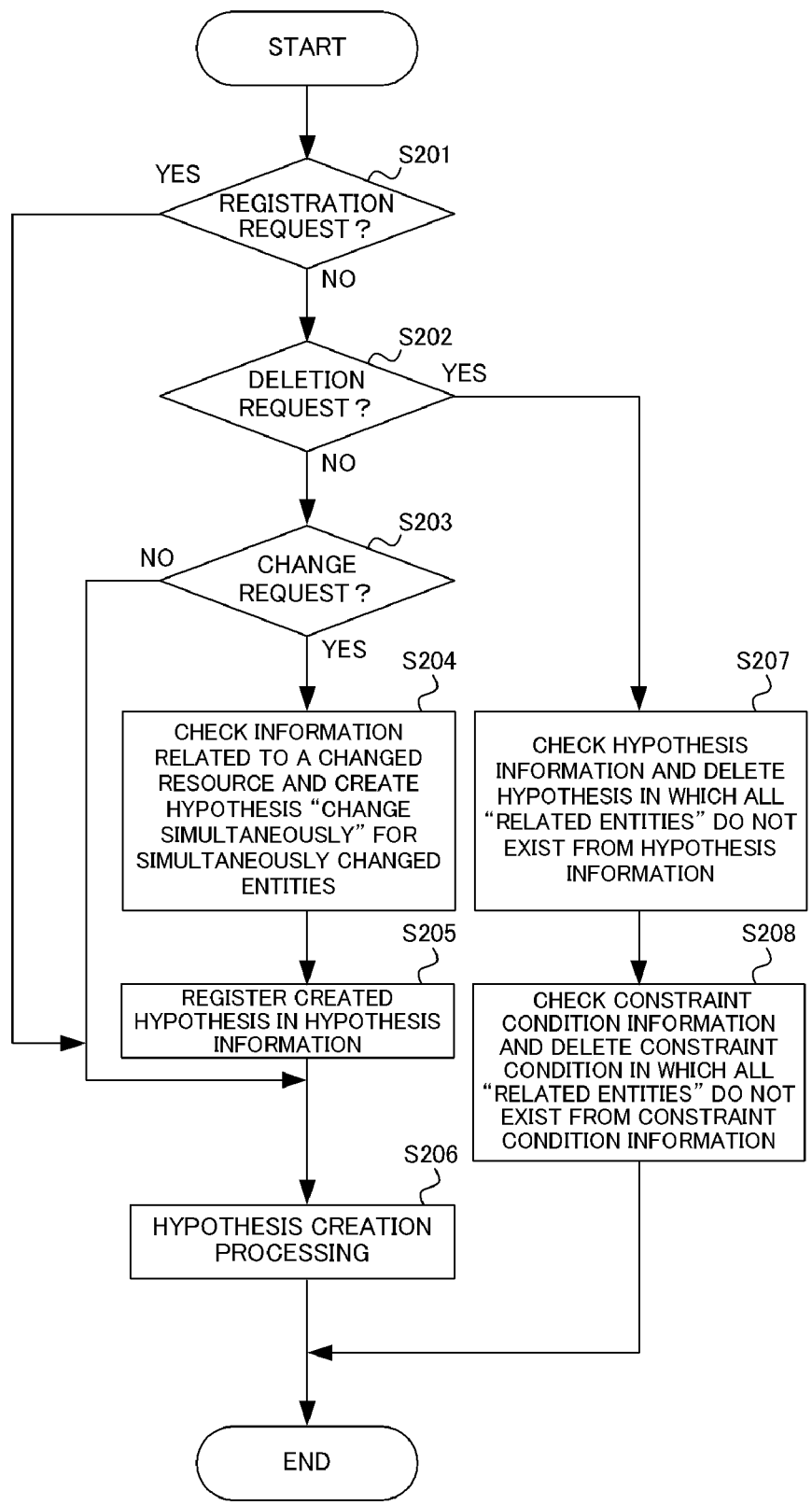
FIG. 6 is a flowchart illustrating operation of a hypothesis management unit.
Figure 7:
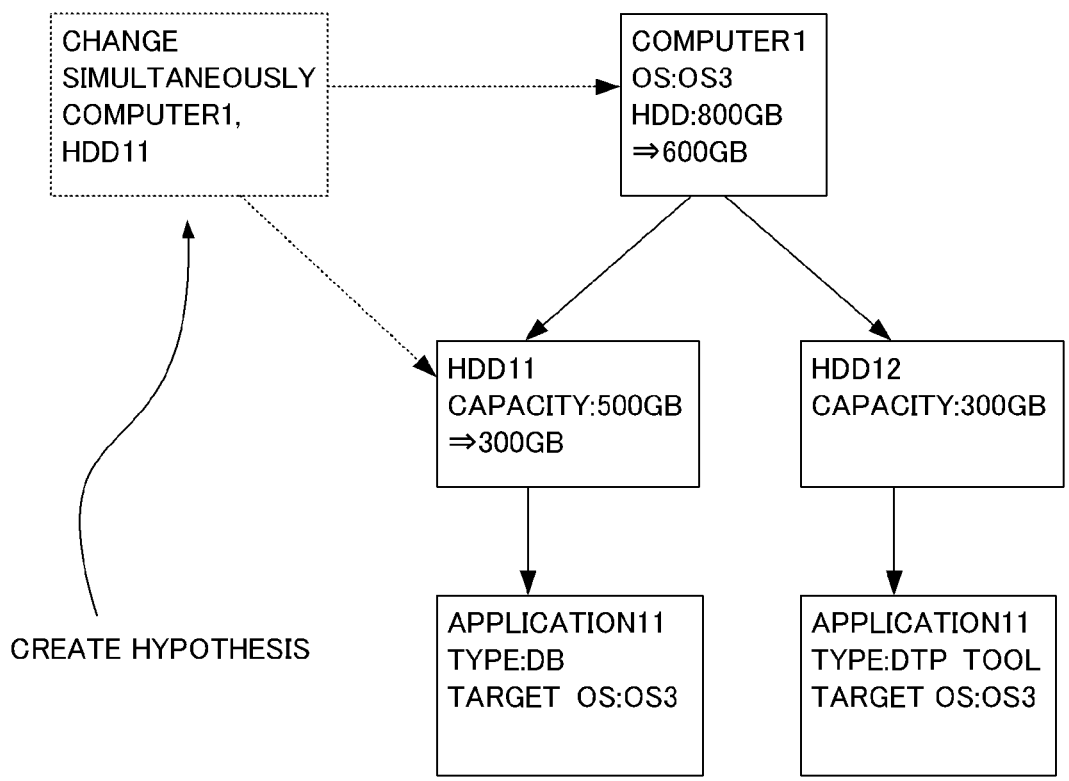
FIG. 7 is a view illustrating an example of creation of a hypothesis "change simultaneously.

Operation of the hypothesis management unit will be described. FIG. 6 is a flowchart illustrating operation of the hypothesis management unit. FIG. 7 is a view illustrating an example of creation of a hypothesis "change simultaneously". In FIG. 6, it is assumed that the hypothesis management unit has already received a hypothesis creation request or hypothesis deletion request from the operation execution unit.

As illustrated in FIG. 6, the hypothesis management unit 104 determines whether a request from the client terminal 20 is a registration request (S201).

In the case where the request issued from the client terminal 20 is not a registration request (NO in S201), the hypothesis management unit 104 determines whether the request issued from the client terminal 20 is a deletion request, i.e., whether the hypothesis management unit 104 has received a hypothesis deletion request from the operation execution unit 101 (S202).

In the case where the request issued from the client terminal 20 is not a detection request (NO in S202), the hypothesis management unit 104 determines whether the request issued from the client terminal 20 is a change request, i.e., whether the hypothesis management unit 104 has received a hypothesis creation request from the operation execution unit 101 (S203).

In the case where the request issued from the client terminal 20 is a change request (YES in S203), the hypothesis management unit 104 checks information related to a changed resource and creates a hypothesis "change simultaneously" for simultaneously changed Entities (S204, second condition setting step). The hypothesis management unit 104 then registers the hypothesis in the hypothesis information DB 108 (S205) and executes hypothesis creation processing to be described later (S206).

Here, creation of the hypothesis "change simultaneously" will be described. As illustrated in FIG. 7, it is assumed that a CI which is a computer 1 having HDDs 11 and 12 exists for HDD capacity and that the capacity of the HDD 11 is changed from 500 GB to 300 GB. In this case, if the HDD capacity of the computer 1 is changed from 800 GB to 600 GB, the hypothesis management unit 104 creates a hypothesis "change simultaneously" for the computer 1 and HDD 11.

As illustrated in FIG. 6, in the determination of step S203, in the case where the request issued from the client terminal 20 is not a change request (NO in S203), the hypothesis management unit 104 executes the hypothesis creation processing (S206).

In the case where the request issued from the client terminal 20 is a deletion request in the determination of step S202 (YES in S202), the hypothesis management unit 104 checks the hypothesis information and deletes a hypothesis in which all the "related Entities" do not exist from the hypothesis information (S207). Further, the hypothesis management unit 104 checks the constraint condition information and deletes a constraint condition in which all the "related Entities" do not exist from the constraint condition information (S208).

In the case where the request issued from the client terminal 20 is a registration request in the determination of step S201 (YES in S201), the hypothesis management unit 104 executes the hypothesis creation processing (S206).

Figure 8:
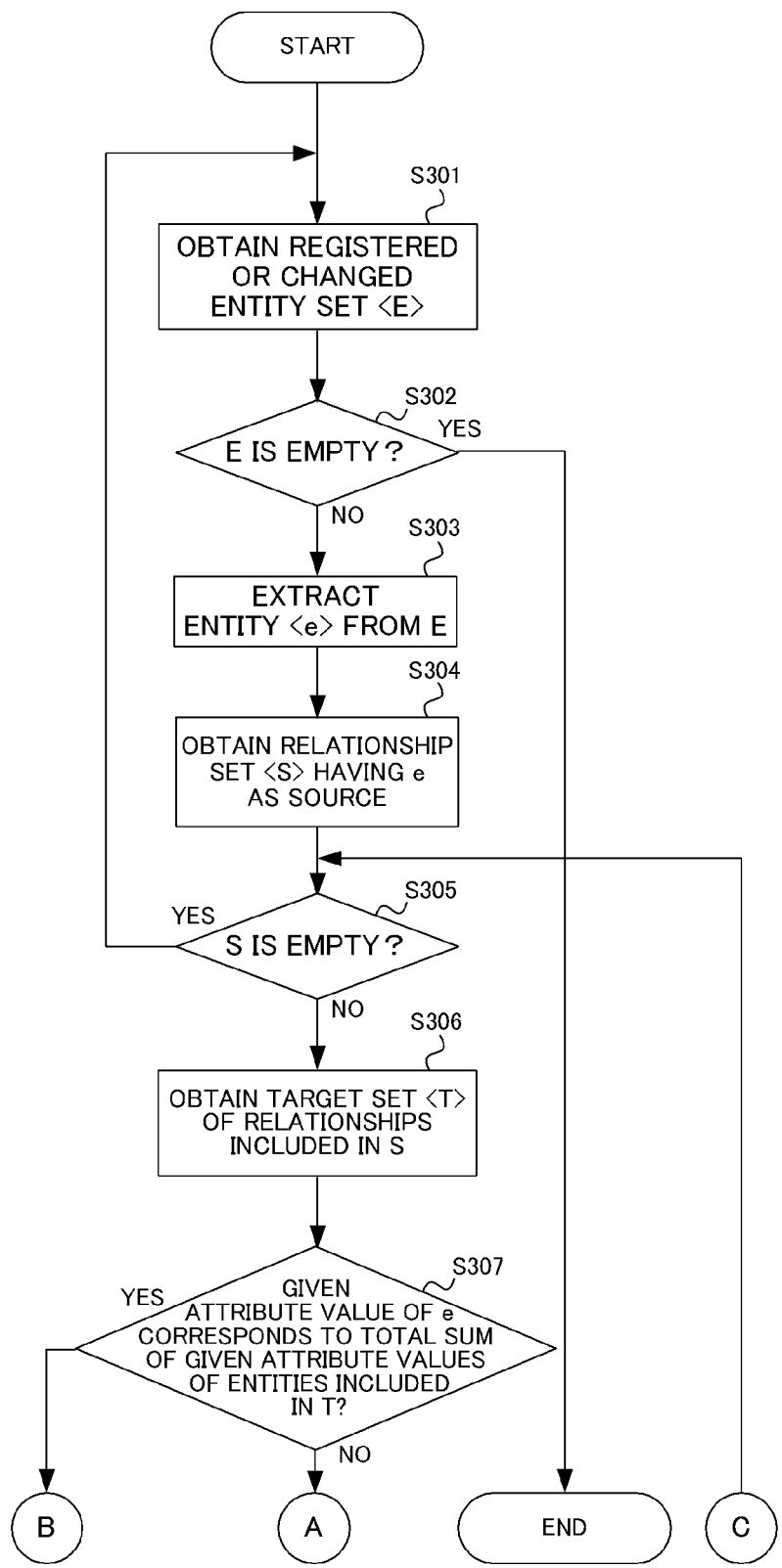
FIG. 8 is a flowchart illustrating operation of hypothesis creation processing.
Figure 9:
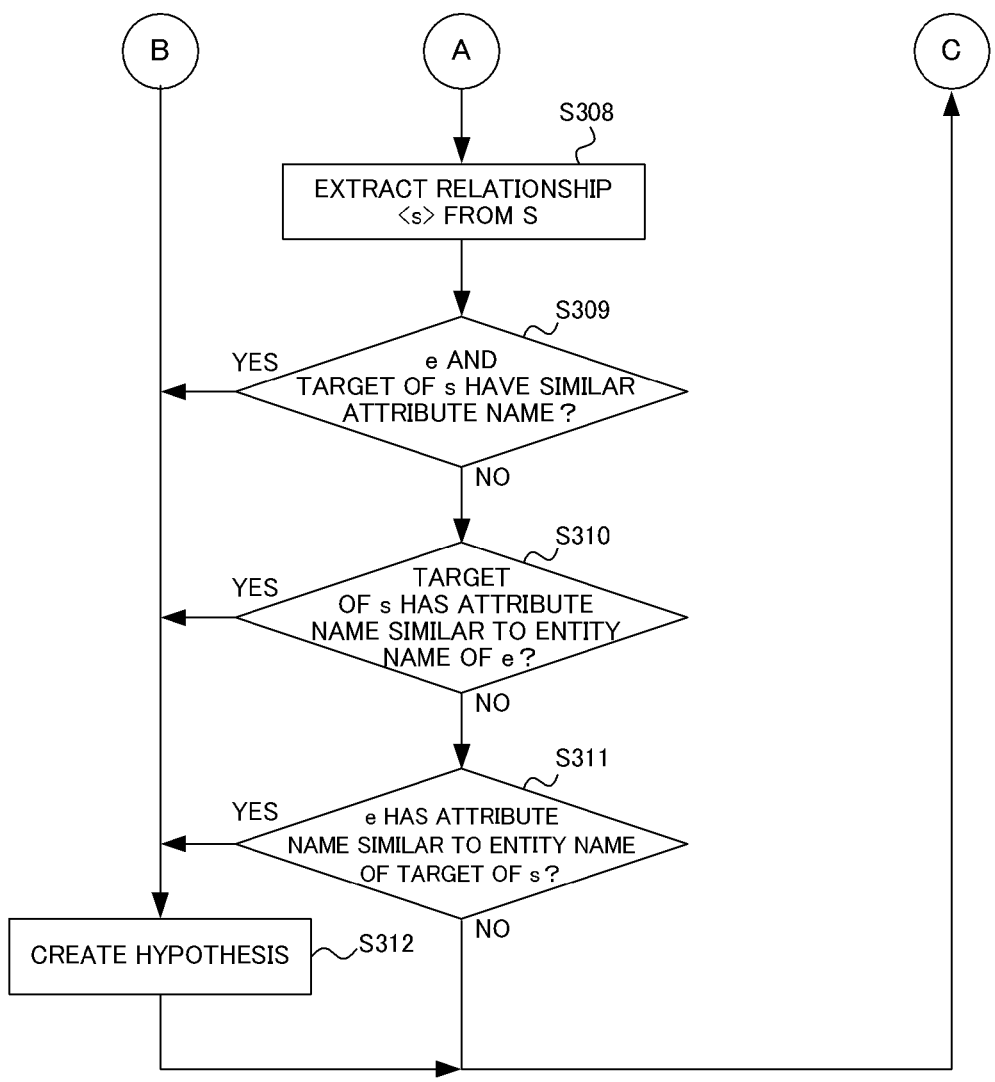
FIG. 9 is a flowchart illustrating operation of hypothesis creation processing.

The hypothesis creation processing performed by the hypothesis management unit will be described. FIGS. 8 and 9 are each a flowchart illustrating operation of the hypothesis creation processing. The hypothesis creation processing is processing corresponding to step S206 in the flowchart of FIG. 6. FIGS. 10 to 13 are views each illustrating an example of creation of a hypothesis.

As illustrated in FIG. 8, the hypothesis management unit 104 obtains a registered or changed Entity set <E> based on information (registration information before being merged or change information, which is hereinafter referred to as "change information") before merged and registered in the CMDB information DB 103 (S301) and determines whether the E is empty (S302).

In the case where the E is not empty (NO in S302), the hypothesis management unit 104 extracts an individual Entity <e> from the E (S303), obtains a Relationship set <S> having the e as a source (S304), and determines whether the S is empty (S305).

In the case where the S is not empty (NO in S305), the hypothesis management unit 104 obtains a Target set <T> of the Relationships included in the S (S306) and determines whether a given attribute value of the e corresponds to the total sum of given attribute values of Entities included in the T (S307).

In the case where a given attribute value of the e does not correspond to the total sum of given attribute values of Entities included in the T (NO in S307), the hypothesis management unit 104 extracts an individual Relationship <s> from the S as illustrated in FIG. 9 (S308) and determines whether the e and target of the s have a similar attribute name by partial matching (S309).

In the case where the e and target of the s do not have a similar attribute name (NO in S309), the hypothesis management unit 104 determines whether the target of the s has an attribute name similar to the Entity name of the e by partial matching (S310).

In the case where the target of the s does not have an attribute name similar to the Entity name of the e (NO in S310), the hypothesis management unit 104 determines whether the e has an attribute name similar to the Entity name of the target of the s by partial matching (S311).

In the case where the e does not have an attribute name similar to the Entity name of the target of s (NO in S311), the hypothesis management unit 104 determines whether the S is empty as illustrated in FIG. 8 (S305).

Figure 10:
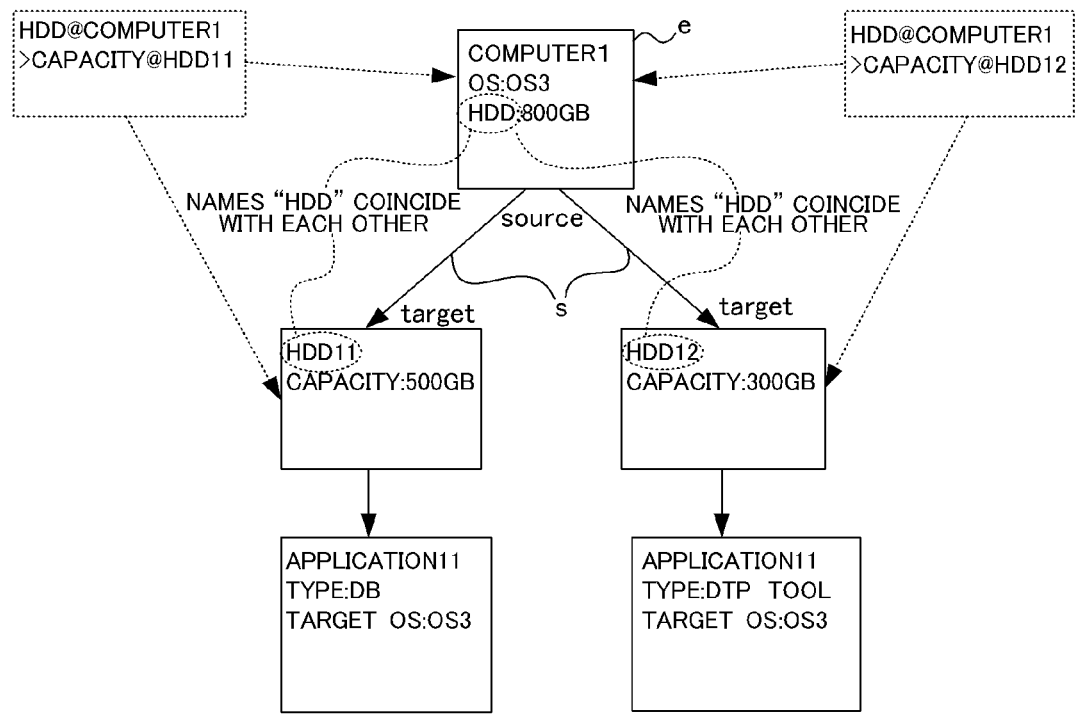
FIG. 10 is a view illustrating an example of creation of a hypothesis.

On the other hand, in the case where the e has an attribute name similar to the Entity name of the target of the s as illustrated in FIG. 10 (YES in S311, second condition setting step), the hypothesis management unit 104 creates a hypothesis using the relationship (e.g., equality between values in two Entities like "HDD@computer1>capacity@HDD11") between the Entities as a condition expression (S312, second condition setting step) and determines whether the S is empty as illustrated in FIG. 8 (S305).

Figure 11:
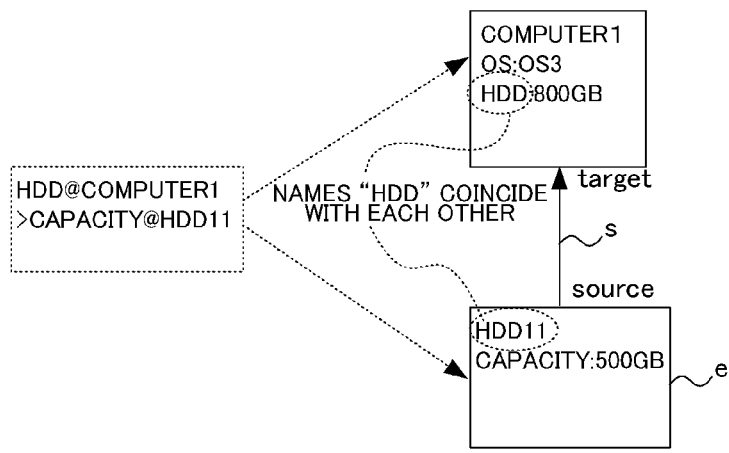
FIG. 11 is a view illustrating an example of creation of a hypothesis.

In the case where the target of the s has an attribute name similar to the Entity name of the e in the determination of step S310 as illustrated in FIG. 11 (YES in S310, second condition setting step), the hypothesis management unit 104 creates a hypothesis using the relationship between the Entities as a condition expression (S312, second condition setting step) and determines whether the S is empty as illustrated in FIG. 8 (S305).

Figure 12:
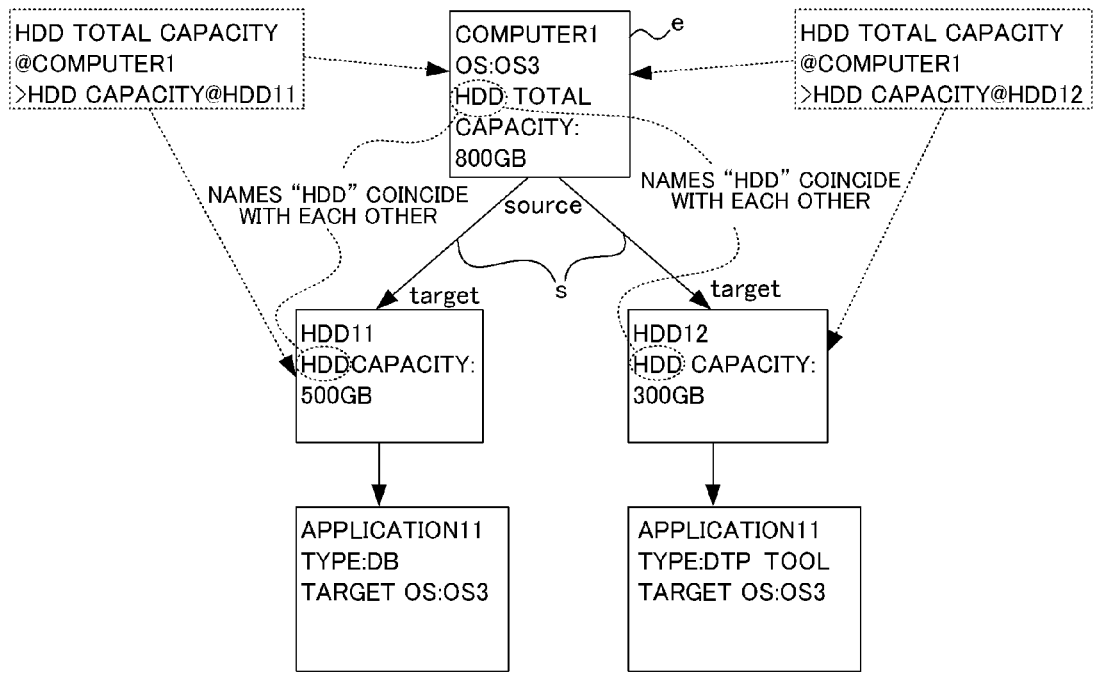
FIG. 12 is a view illustrating an example of creation of a hypothesis.

In the case where the e and target of the s have a similar attribute name in the determination of step S309 as illustrated in FIG. 12 (YES in S309, second condition setting step), the hypothesis management unit 104 creates a hypothesis using the relationship between the Entities as a condition expression (S312, second condition setting step) and determines whether the S is empty as illustrated in FIG. 8 (S302).

Figure 13:
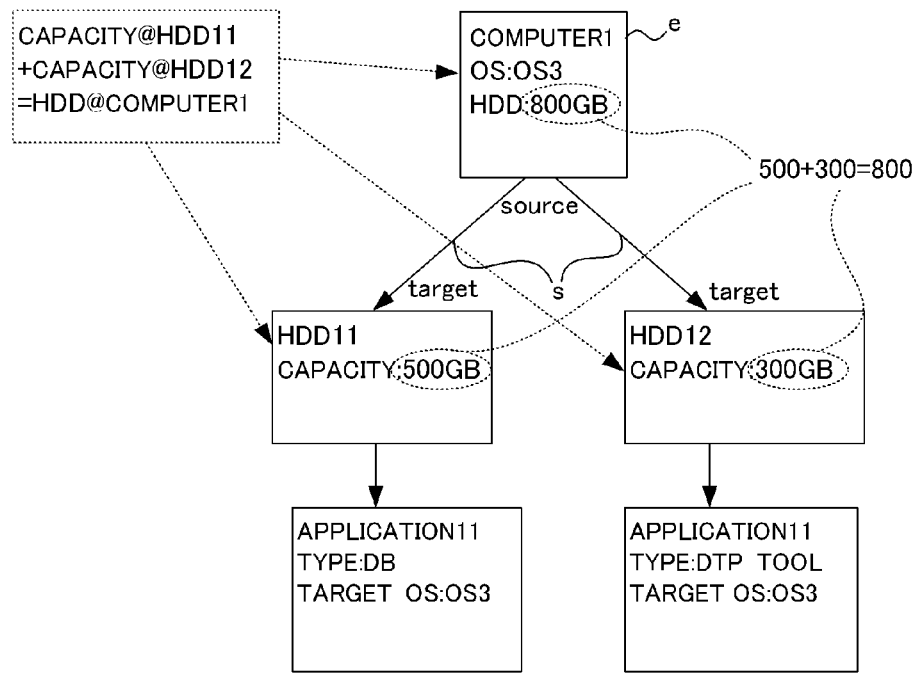
FIG. 13 is a view illustrating an example of creation of a hypothesis.

In the case where a given attribute value of the e corresponds to the total sum of given attribute values of Entities included in the T as illustrated in FIG. 13 in the determination of step S307 (YES in S307), the hypothesis management unit 104 creates a hypothesis using the relationship between those Entities (e.g., "capacity@HDD11+capacity@HDD12=HDD@computer1") (S312) and determines whether the S is empty as illustrated in FIG. 8 (S302).

Figure 14:
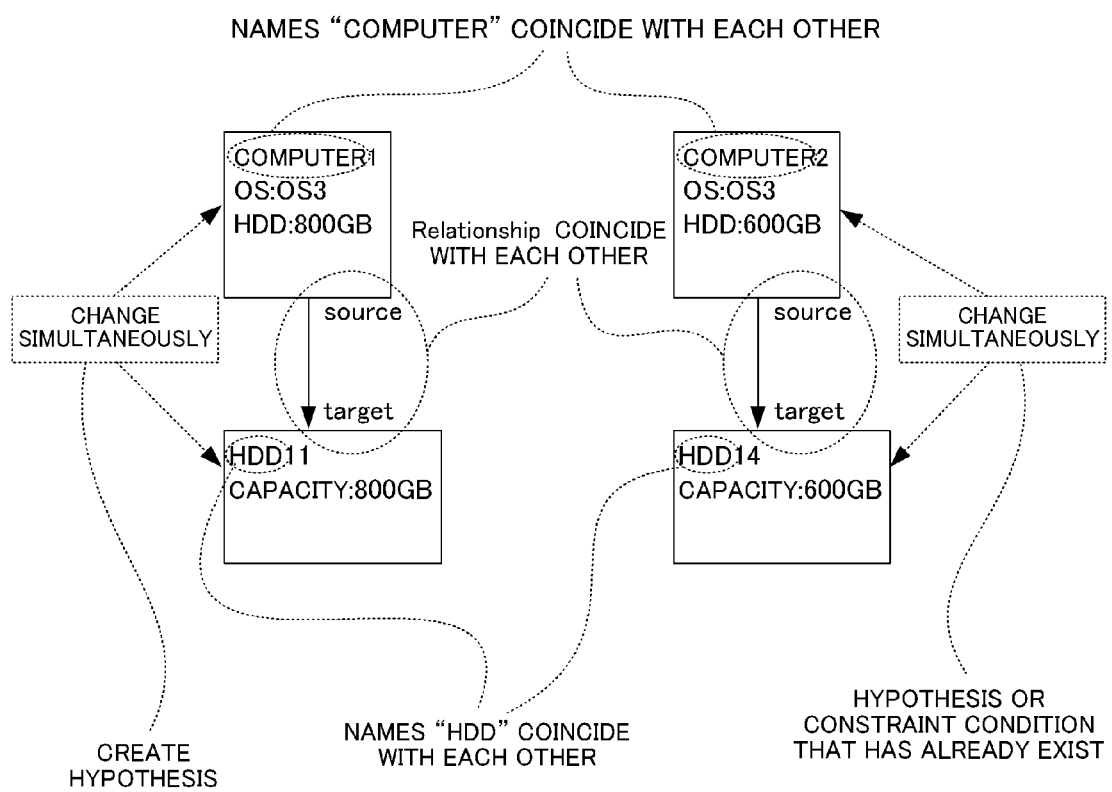
FIG. 14 is a view illustrating an example of creation of a hypothesis.

The hypothesis management unit 104 may create a hypothesis similar to the Entity having a similar configuration for which a hypothesis or a constraint condition has been set. More specifically, as illustrated in FIG. 14, the hypothesis management unit 104 determines that two Entities are similar when the names of the Entities and targets partially coincide therebetween and Relationships coincide therebetween.

As described above, the relationship between Entities is set as a trigger and defined as a condition expression and, thereby, a hypothesis can automatically be created. The determination whether the names in the hypothesis creation processing coincide with each other may be made by any known method.

Figure 15:
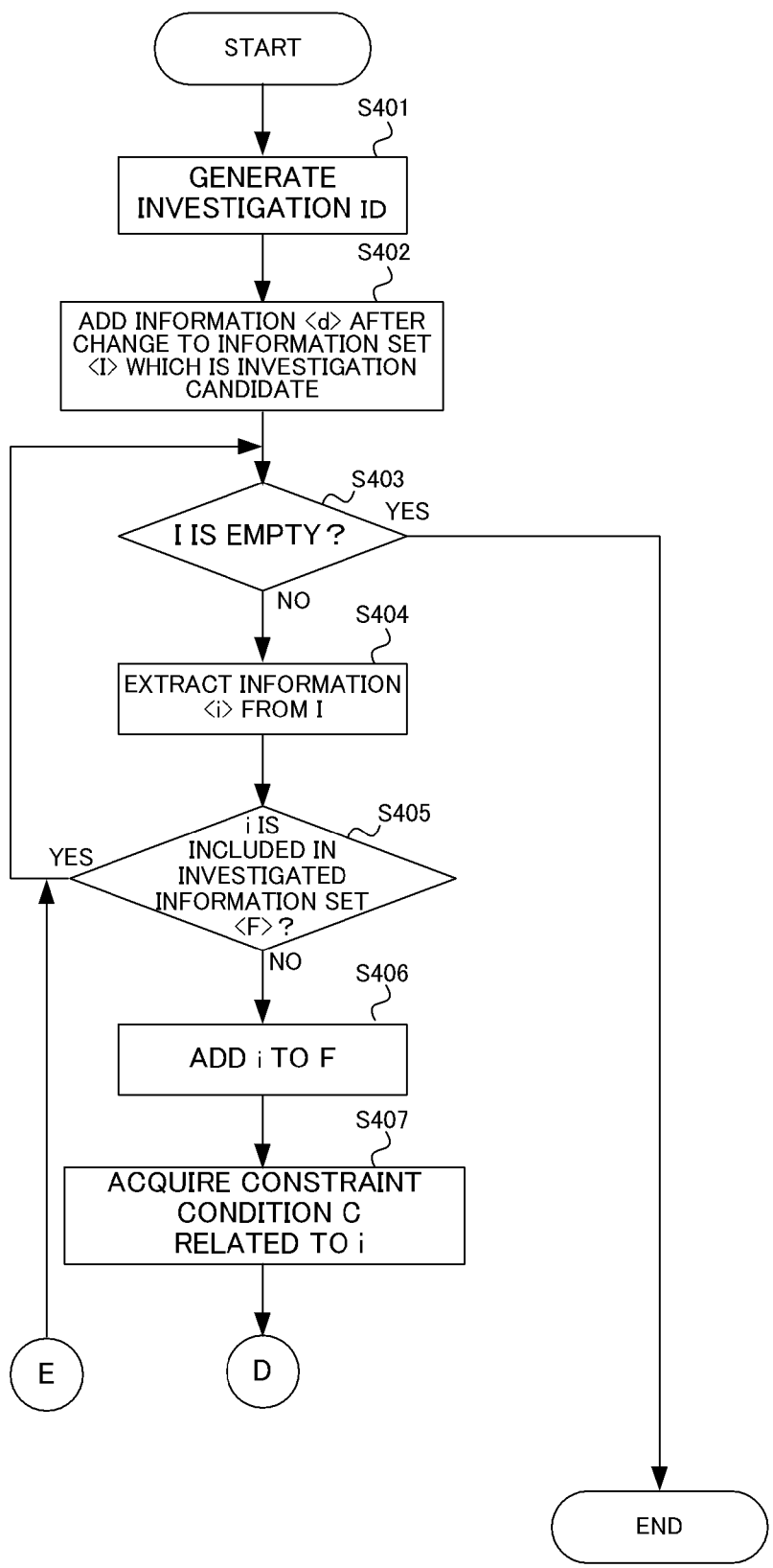
FIG. 15 is a flowchart illustrating operation of an influence investigation execution unit.
Figure 16:
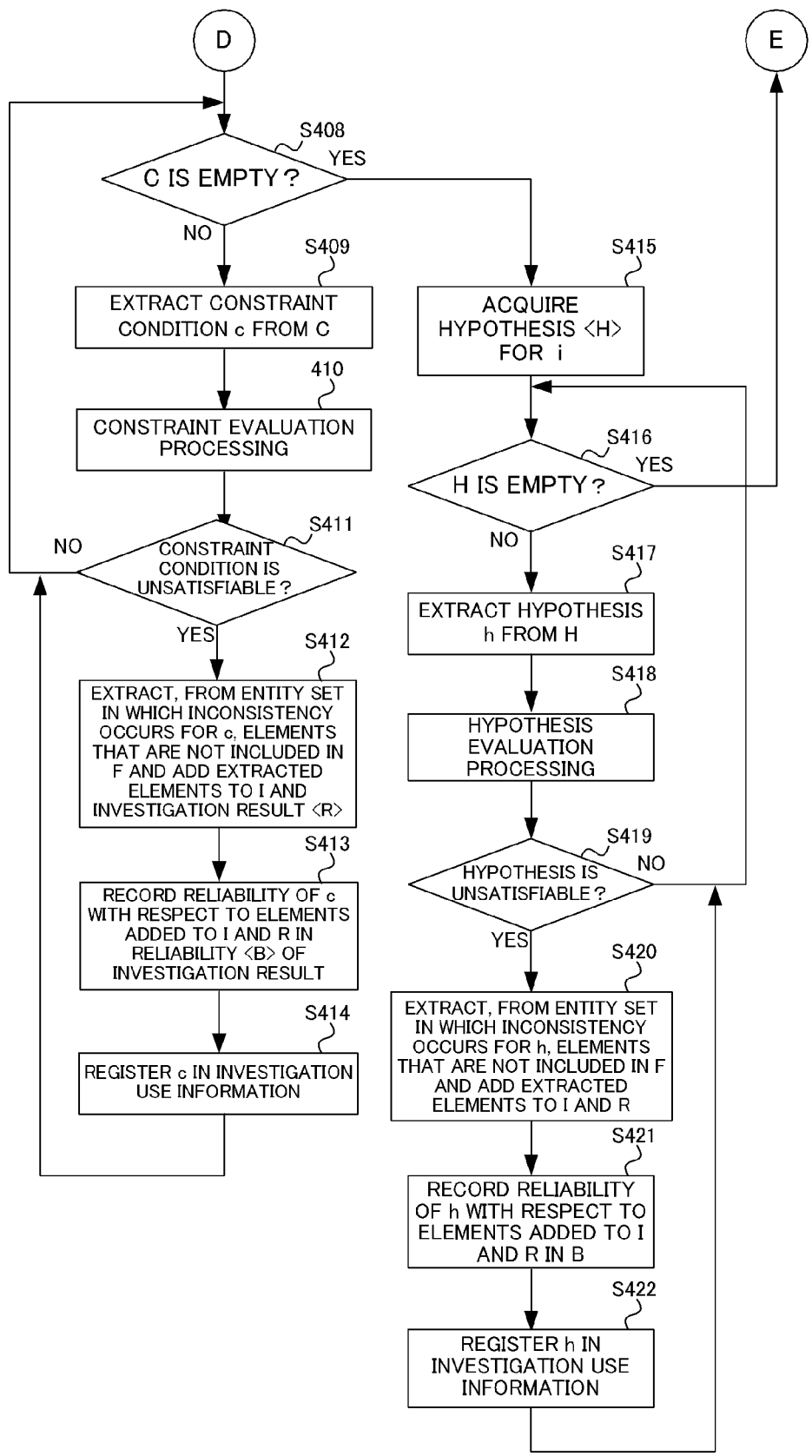
FIG. 16 is a flowchart illustrating operation of an influence investigation execution unit.

Operation of the influence investigation execution unit will be described. FIGS. 15 and 16 are each a flowchart illustrating operation of the influence investigation execution unit. In FIGS. 15 and 16, it is assumed that the hypothesis management unit has already received an influence investigation request from the operation execution unit. The influence investigation execution unit checks a hypothesis and a constraint condition which become unsatisfiable in the influence investigation.

First, the influence investigation execution unit 105 that has received the influence investigation request generates an investigation ID (S401), adds information <d> after change (change information) to an information set <I> (hypothesis and constraint) which is an investigation candidate (S402), and determines whether the I is empty (S403). The information after change is information added in the influence investigation request, which indicates a change (concretely, attribute information after change) made for the CI.

In the case where the I is not empty (NO in S403), the influence investigation execution unit 105 extracts individual information <i> from the I (S404) and determines whether the i is included in an investigated information set <F> (unsatisfiable constraint condition and unsatisfiable hypothesis in the investigation use information illustrated in FIG. 4) (S405).

In the case where the i is not included in the F (NO in S405), the influence investigation execution unit 105 adds the i to the F (S406), acquires a constraint condition set <C> related to the i (S407, first condition extraction step), and determines whether the C is empty (S408) as illustrated in FIG. 16 (S408).

In the case where the C is not empty (NO in S408), the influence investigation execution unit 105 extracts an individual constraint condition <c> from the C (S409), executes constraint evaluation processing to be described later (S410, first condition determination step), and determines whether the constraint condition is unsatisfiable (S411). The constraint evaluation processing is processing of determining whether the constraint condition is unsatisfiable or satisfiable.

In the case where the constraint condition is unsatisfiable (YES in S411), the influence investigation execution unit 105 extracts, from the Entity in which inconsistency occurs for the c, elements that are not included in the F, adds the extracted elements to the I and an investigation result <R> (S412), and records the reliability of the C with respect to the elements added to the I and R in reliability <B> of the investigation result (S413). Further, the influence investigation execution unit 105 registers the c in the investigation use information together with the B (S414) and determines whether the C is empty (S408).

On the other hand, in the case where the constraint condition is not unsatisfiable (NO in S411), the influence investigation execution unit 105 determines whether the C is empty (S408).

In the case where the C is empty in the determination of step S408 (YES in S408), the influence investigation execution unit 105 acquires a hypothesis set <H> for the i (S415, second condition extraction step) and determines whether the H is empty (S416).

In the case where the H is not empty (NO in S416), the influence investigation execution unit 105 extracts an individual hypothesis <h> from the H (S417), executes hypothesis evaluation processing to be described later (S417, second condition determination step), and determines whether the hypothesis is unsatisfiable (S419). The hypothesis evaluation processing is processing of determining whether the hypothesis is unsatisfiable or satisfiable.

In the case where the hypothesis is unsatisfiable (YES in S419), the influence investigation execution unit 105 extracts, from the Entity set in which inconsistency occurs for the h, elements that are not included in the F, adds the extracted elements to the I and R (S420), and records the reliability of the h with respect to the elements added to the I and R in the \<B\> (S421). Further, the influence investigation execution unit 105 registers the h in the investigation use information (S422) and determines whether the H is empty (S416).

On the other hand, in the case where the hypothesis is not unsatisfiable (NO in S419), the influence investigation execution unit 105 determines whether the H is empty (S416).

In the case where the H is empty in the determination of step S416 (YES in S416), the influence investigation execution unit 105 determines whether the I is empty (S403).

In the case where the i is included in the F in the determination of step S405 (YES in S405), the influence investigation execution unit 105 determines whether the I is empty (S403).

In the case where the I is empty in the determination of step S403 (YES in S403), the influence investigation execution unit 105 ends the processing.

Figure 17:
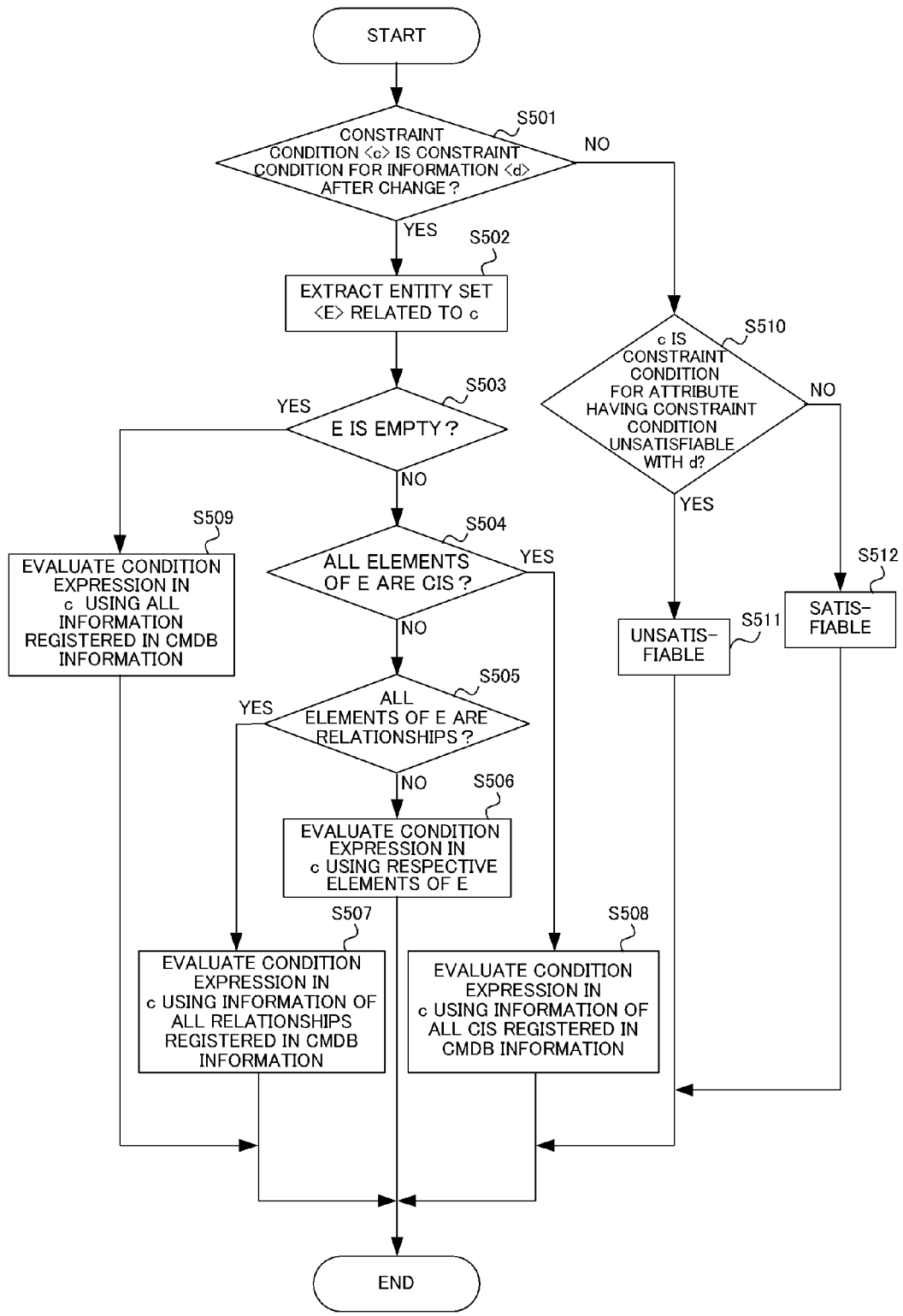
FIG. 17 is a flowchart illustrating operation of constraint evaluation processing.
Figure 18:
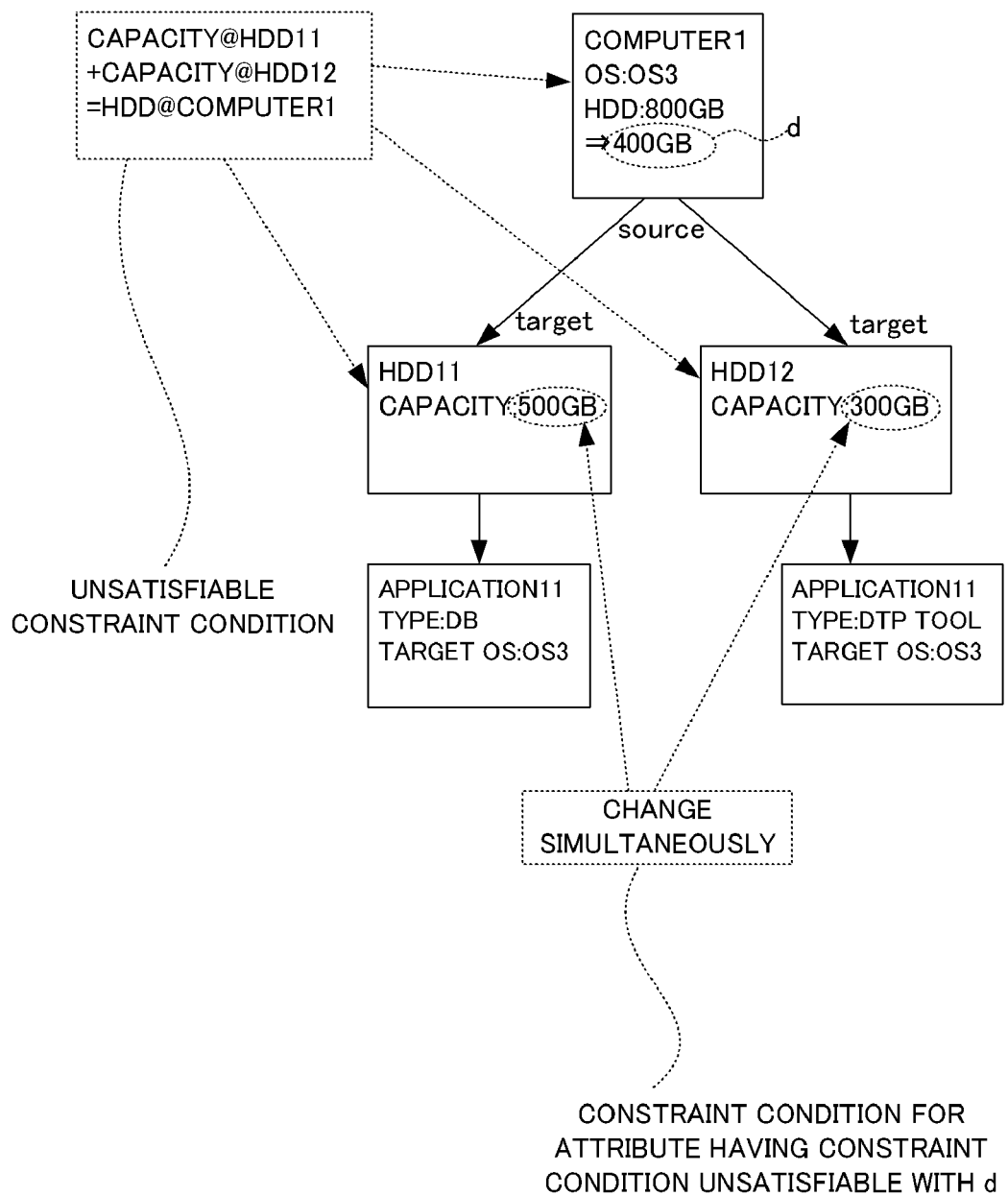
FIG. 18 is a view illustrating a constraint condition related to an attribute having a constraint condition unsatisfiable with information after change.

The constraint evaluation processing will be described. The constraint evaluation processing is processing corresponding to step S410 in the flowchart of FIG. 16. FIG. 17 is a flowchart illustrating operation of the constraint evaluation processing. FIG. 18 is a view illustrating a constraint condition for an attribute having a constraint condition unsatisfiable with information after change.

As illustrated in FIG. 17, the influence investigation execution unit 105 determines whether the individual constraint condition \<c\> in the constraint condition set \<C\> is a constraint condition for the information \<d\> after change (S501).

In the case where the c is a constraint condition for the d (YES in S501), the influence investigation execution unit 105 extracts the Entity set \<E\> related to the c with reference to the investigation use information (S502) and determines whether the E is empty (S503).

In the case where the E is not empty (NO in S503), the influence investigation execution unit 105 determines whether all the elements of the E are CIs (S504).

In the case where not all the elements of the E are Relationships (NO in S505), the influence investigation execution unit 105 evaluates a condition expression in the c using respective elements of the E (S506).

On the other hand, in the case where all the elements of the E are Relationships (YES in S505), the influence investigation execution unit 105 evaluates a condition expression in the c using information of all the Relationships registered in the CMDB information (S507).

In the case where all the elements of the E are CIs in step S504 (YES in S504), the influence investigation execution unit 105 evaluates a condition expression in the c using information of all the CIs registered in the CMDB information (S508).

In the case where the E is empty in step S503 (Yes in S503), the influence investigation execution unit 105 evaluates a condition expression in the c using all the information registered in the CMDB information (S509).

In the case where the c is not a constraint condition for the d in step S501 (NO in S501), the influence investigation execution unit 105 determines whether the c is a constraint condition for an attribute unsatisfiable with the d (S510).

In the case where the c is a constraint condition for an attribute unsatisfiable with the d as illustrated in FIG. 18 (YES in S510), the influence investigation execution unit 105 determines that the c is a constraint condition unsatisfiable for the d (S511).

On the other hand, in the case where the c is not a constraint condition for an attribute unsatisfiable with the d (NO in S510), the influence investigation execution unit 105 determines that the c is a constraint condition satisfiable for the d (S512).

The evaluation in steps S506, S507, S508, and S509 is made for determining whether a constraint condition is unsatisfiable or satisfiable. By selecting information used for evaluating a condition expression according to the Entity related to the constraint condition, the influence investigation execution unit 105 can evaluate the constraint condition with minimum necessary information.

Further, by determining whether an individual constraint condition is a constraint condition for an attribute having a constraint condition unsatisfiable with the information after change in step S510, it is possible to make a simple evaluation for a constraint condition other than the constraint conditions for the information after change.

Figure 19:
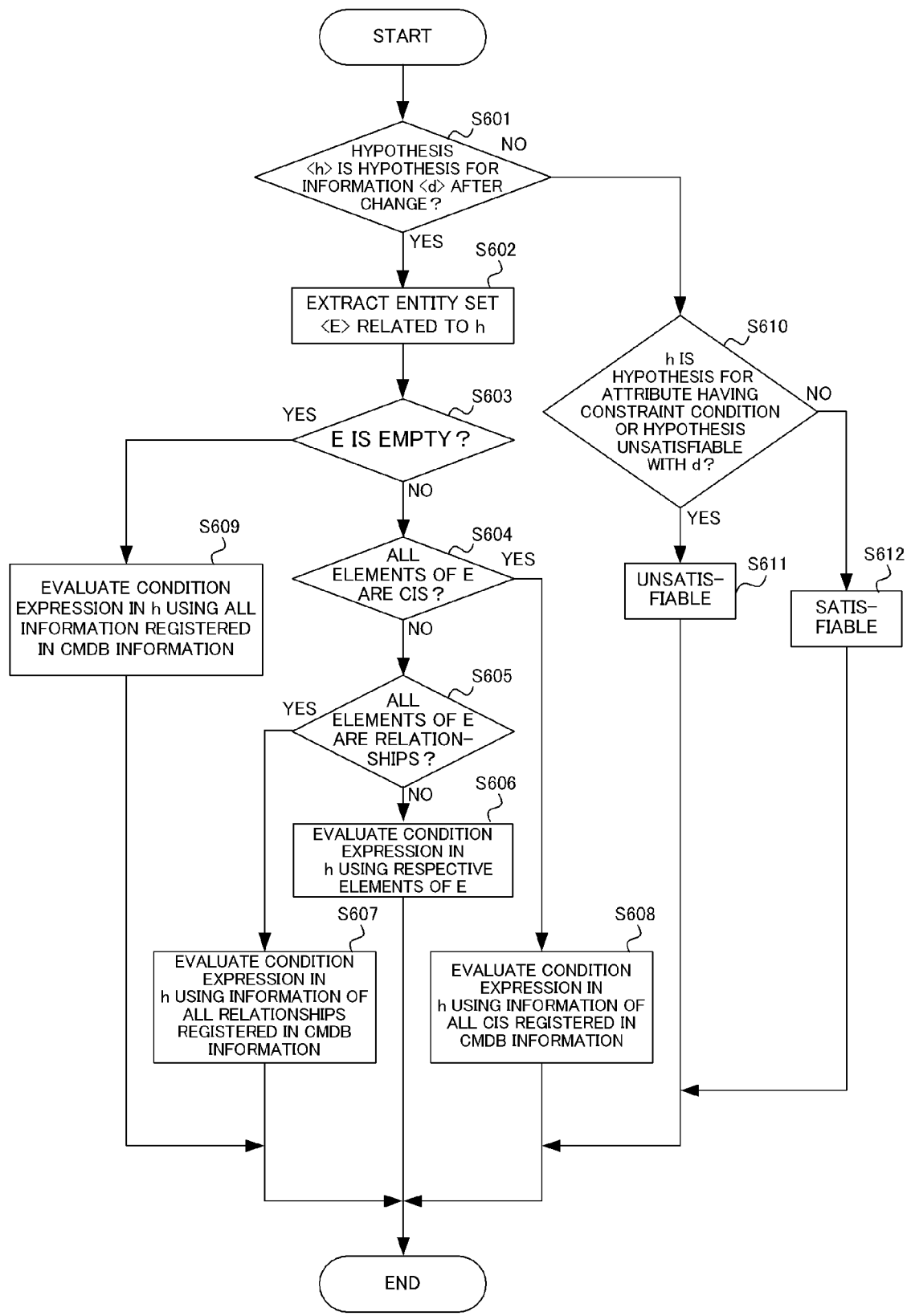
FIG. 19 is a flowchart illustrating operation of hypothesis evaluation processing.
Figure 20:
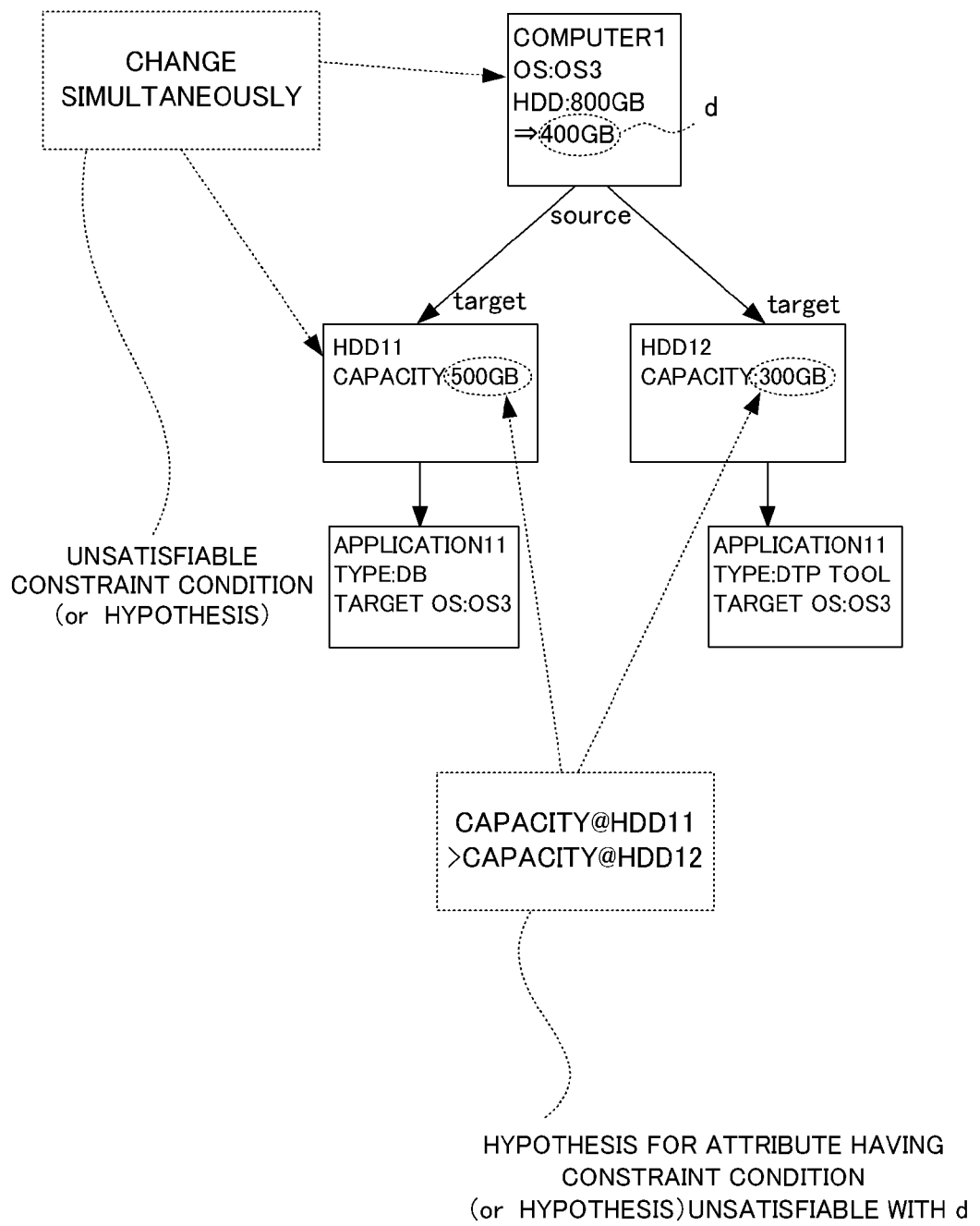
FIG. 20 is a view illustrating a hypothesis for an attribute having a constraint condition or a hypothesis unsatisfiable with information after change.

The hypothesis evaluation processing will be described. The hypothesis evaluation processing is processing corresponding to step S418 in the flowchart of FIG. 16. FIG. 19 is a flowchart illustrating operation of the hypothesis evaluation processing. FIG. 20 is a view illustrating a hypothesis for an attribute having a constraint condition or a hypothesis unsatisfiable with information after change.

As illustrated in FIG. 19, the influence investigation execution unit 105 determines whether the individual hypothesis \<h\> in the hypothesis set \<H\> is a hypothesis for the information \<d\> after change (S601).

In the case where the h is a hypothesis for the d (YES in S601), the influence investigation execution unit 105 extracts the Entity set \<E\> related to the h with reference to the investigation use information (S602) and determines whether the E is empty (S603).

In the case where the E is not empty (NO in S603), the influence investigation execution unit 105 determines whether all the elements of the E are CIs (S604).

In the case where not all the elements of the E are CIs (NO in S604), the influence investigation execution unit 105 determines whether all the elements of the E are relationships (S605).

In the case where not all the elements of the E are Relationships (NO in S605), the influence investigation execution unit 105 evaluates a condition expression in the h using respective elements of the E (S606).

On the other hand, in the case where all the elements of the E are Relationships (YES in S605), the influence investigation execution unit 105 evaluates a condition expression in the h using information of all the Relationships registered in the CMDB information (S607).

In the case where all the elements of the E are CIs in step S604 (YES in S604), the influence investigation execution unit 105 evaluates a condition expression in the h using information of all the CIs registered in the CMDB information (S608).

In the case where the E is empty in step S603 (Yes in S603), the influence investigation execution unit 105 evaluates a condition expression in the h using all the information registered in the CMDB information (S609).

In the case where the h is not a hypothesis for the d in step S601 (NO in S601), the influence investigation execution unit 105 determines whether the h is a hypothesis for an attribute having a constraint condition or hypothesis unsatisfiable with the d (S610).

In the case where the h is a hypothesis for an attribute having a constraint condition or hypothesis unsatisfiable with the d as illustrated in FIG. 20 (YES in S610), the influence investigation execution unit 105 determines that the h is a hypothesis unsatisfiable for the d (S611).

On the other hand, in the case where the h is not a hypothesis for an attribute having a constraint condition or hypothesis unsatisfiable with the d (NO in S610), the influence investigation execution unit 105 determines that the h is a hypothesis satisfiable for the d (S612).

The evaluation in steps S606, S607, S608, and S609 is made for determining whether a hypothesis is unsatisfiable or satisfiable. By selecting information used for evaluating a condition expression according to the Entity related to the hypothesis, the influence investigation execution unit 105 can evaluate the hypothesis with minimum necessary processing.

Further, by determining whether an individual hypothesis is a hypothesis for an attribute having a constraint condition or hypothesis unsatisfiable with the information after change, it is possible to make a simple evaluation for a hypothesis other than the hypotheses for the information after change. By determining whether an individual hypothesis is a hypothesis for an attribute having unsatisfiable constraint condition, it is possible to obtain an evaluation based on a constraint condition having higher accuracy than a hypothesis.

Figure 21:
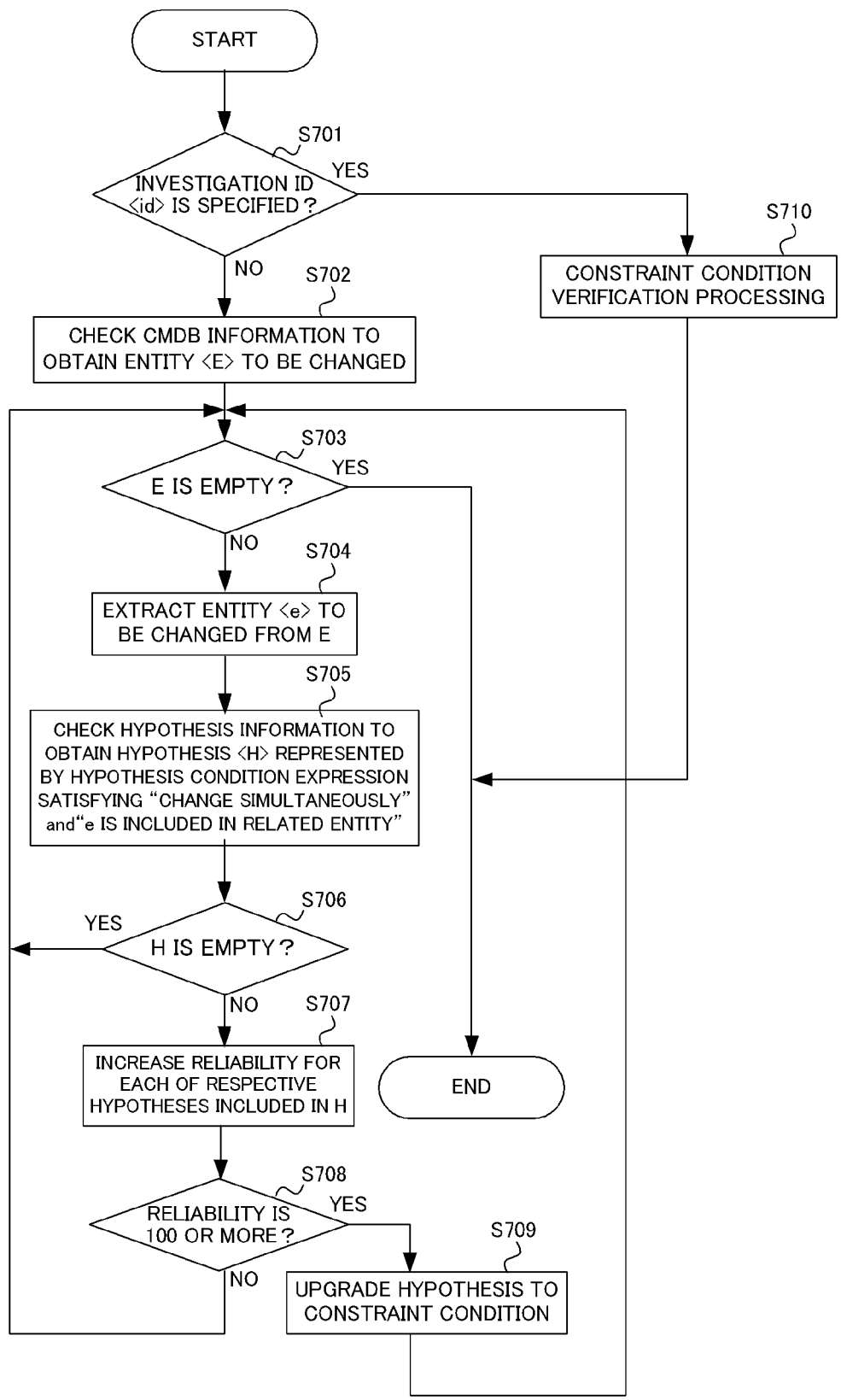
FIG. 21 is a flowchart illustrating operation of a verification unit.

Operation of the verification unit will be described. FIG. 21 is a flowchart illustrating operation of the verification unit. In FIG. 21, it is assumed that the verification unit has already received a verification request from the operation execution unit. The verification unit performs verification to upgrade a hypothesis to a constraint condition and downgrade a constraint condition to a hypothesis.

First, the verification unit 106 determines whether an investigation ID <id> is specified in the verification request (S701).

In the case where the id is not specified (NO in S701), the verification unit 106 checks the CMDB information to obtain an Entity <E> to be changed (S702) and determines whether the E is empty (S703).

In the case where the E is not empty (NO in S703), the verification unit 106 extracts an individual Entity <e> to be changed from the E (S704), checks hypothesis information to obtain a hypothesis <H> represented by a hypothesis condition expression "change simultaneously" and including the e in the related Entity and determines whether the H is empty (S706).

In the case where the H is not empty (NO in S706), the verification unit 106 increases the reliability for each of respective hypotheses included in the H (S707, addition step) and determines, for each hypothesis, whether the resultant reliability is 100 or more (S708).

In the case where the reliability of the hypothesis is 100 or more (YES in S708), the verification unit 106 upgrades the hypothesis to a constraint condition (S709).

On the other hand, in the case where the reliability of the hypothesis is less than 100 (NO in S708), the verification unit 106 determines whether the E is empty (S703).

In the case where the H is empty in step S706 (YES in S706), the verification unit 106 determines whether the E is empty (S703).

In the case where the E is empty in step S703 (YES in S703), the verification unit 106 ends the processing.

In the case where the id is specified in step S701 (YES in S701), the verification unit 106 executes constraint condition verification processing to be described later (S710).

Figure 22:
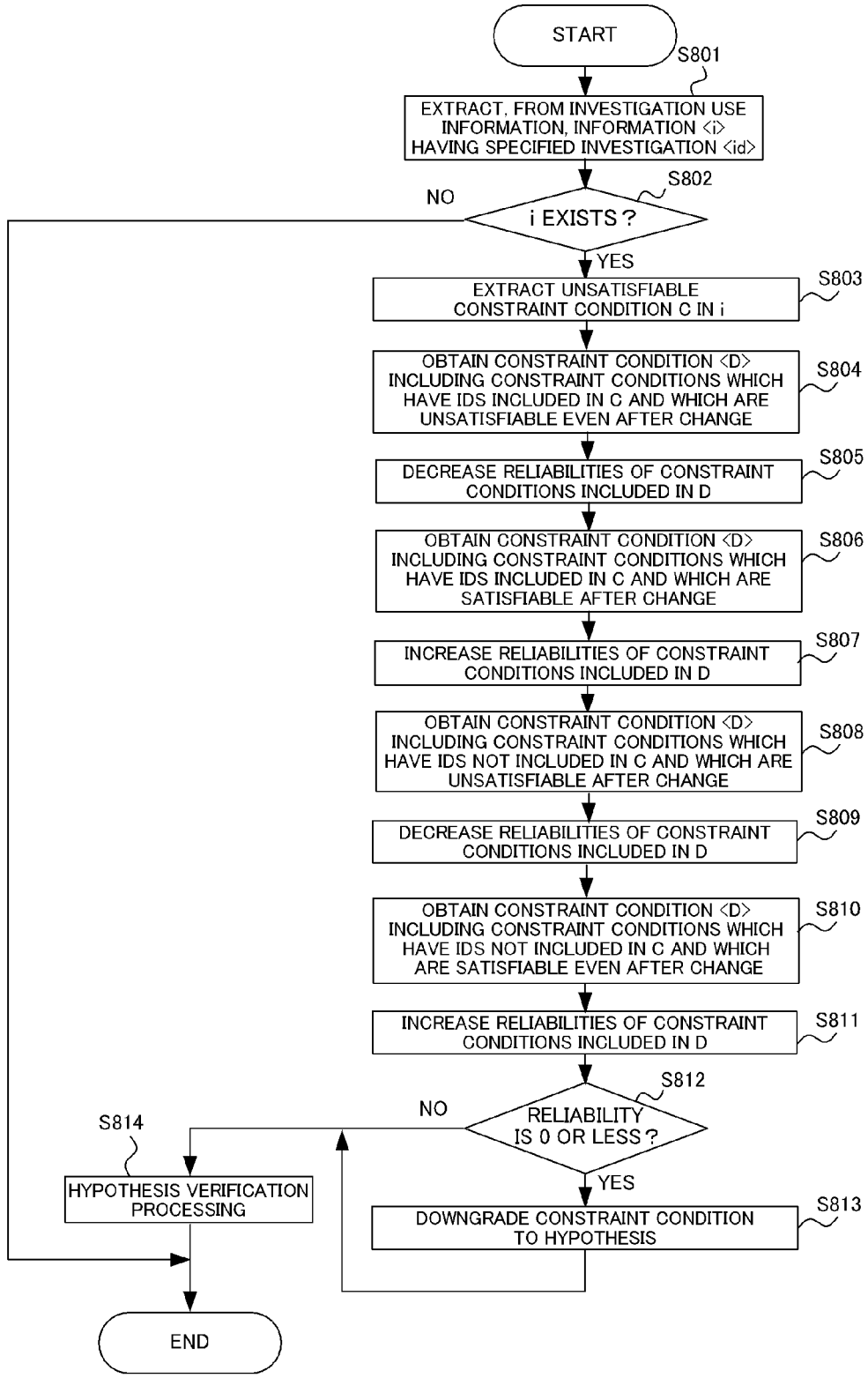
FIG. 22 is a flowchart illustrating operation of constraint condition verification processing.

The constraint condition verification processing will be described. FIG. 22 is a flowchart illustrating operation of the constraint condition verification processing. The constraint condition verification processing is processing corresponding to step S710 in the flowchart of FIG. 21.

First, the verification unit 106 extracts, from the investigation use information, information <i> having the investigation ID<id> specified in a verification request (S801) and determines whether the i exists (S802).

In the case where the i exists (YES in S802), the verification unit 106 extracts an unsatisfiable constraint condition C in the i (S803), obtains a constraint condition <D> including constraint conditions which have constraint condition IDs included in the C and which are unsatisfiable even after change (S804), and decreases the reliabilities of the constraint conditions included in the D (S805, first subtraction step).

Then, the verification unit 106 obtains a constraint condition <D> including constraint conditions which have constraint condition IDs included in the C and which are satisfiable after change (S806) and increases the reliabilities of the constraint conditions included in the D (S807).

Then, the verification unit 106 obtains a constraint condition <D> including constraint conditions which have constraint condition IDs not included in the C and which are unsatisfiable after change (S808) and decreases the reliabilities of the constraint conditions included in the D (S809, first subtraction step).

Further, the verification unit 106 obtains a constraint condition <D> including constraint conditions which have constraint condition IDs not included in the C and which are satisfiable even after change (S810), increases the reliabilities of the constraint conditions included in the D (S811), and determines, for each of the constraint conditions whose reliabilities have been changed, whether the reliability is 0 or less (S812).

In the case where the reliability is 0 or less (YES in S812), the verification unit 106 downgrades the constraint condition to a hypothesis (S813, second condition change step) and executes hypothesis verification processing to be described later (S814).

On the other hand, in the case where the reliability is more than 0 (NO in S812), the verification unit 106 executes hypothesis verification processing to be described later (S814).

Figure 23:
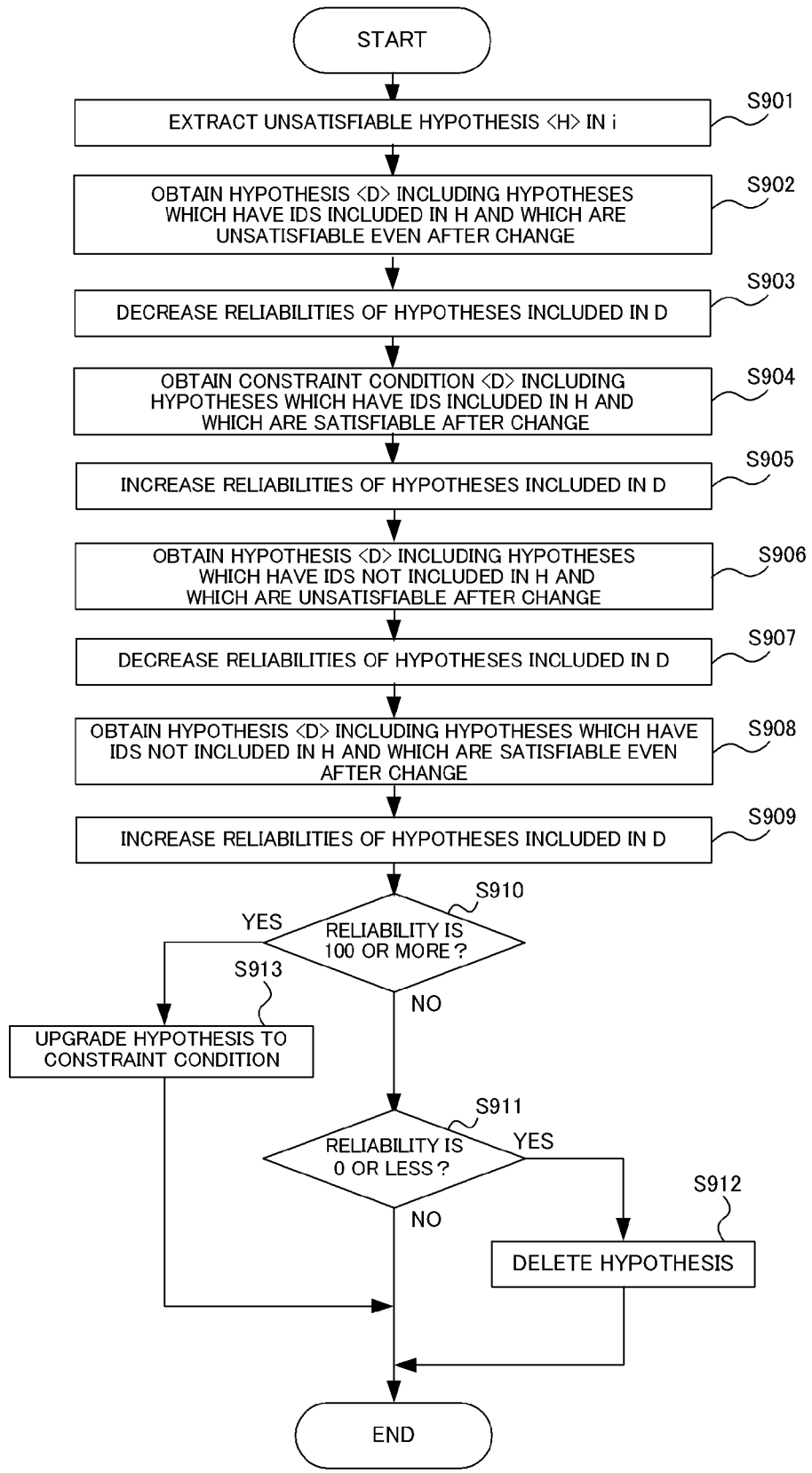
FIG. 23 is a flowchart illustrating operation of hypothesis verification processing.

The hypothesis verification processing will be described. FIG. 23 is a flowchart illustrating operation of the hypothesis verification processing. The hypothesis verification processing is processing corresponding to step S814 in the flowchart of FIG. 22.

First, the verification unit 106 extracts an unsatisfiable hypothesis <H> in the i (S901), obtains a hypothesis <D> including hypotheses which have hypothesis IDs included in the H and which are unsatisfiable even after change (S902), and decreases the reliabilities of the hypotheses included in the D (S903, second subtraction step).

Then, the verification unit 106 obtains a hypothesis <D> including hypotheses which have hypothesis IDs included in the H and which are satisfiable after change (S904) and increases the reliabilities of the hypotheses included in the D (S905, addition step).

Then, the verification unit 106 obtains a hypothesis <D> including hypotheses which have hypothesis IDs not included in the H and which are unsatisfiable after change (S906) and decreases the reliabilities of the hypotheses included in the D (S907, second subtraction step).

Further, the verification unit 106 obtains a hypothesis <D> including hypotheses which have hypothesis IDs not included in the H and which are satisfiable even after change (S908), increases the reliabilities of the hypotheses included in the D (S909), and determines, for each of the hypotheses whose reliabilities have been changed, whether the reliability is 100 or more (S910).

In the case where the reliability is not 100 or more (NO in S910), the verification unit 106 determines whether the reliability of the hypothesis is 0 or less (S911).

In the case where the reliability is not 0 or less (NO in S911), the verification unit 106 ends the processing.

In the case where the reliability is 0 or less (YES in S911), the verification unit 106 deletes the hypothesis (S912, deletion step).

In the case where the reliability is 100 or more in step S910 (YES in S910), the verification unit 106 upgrades the hypothesis to a constraint condition (S913, first condition change step, first condition setting step).

As described above, by changing the reliability set for the hypothesis and constraint condition to upgrade a hypothesis having a reliability not less than a predetermined value to a constraint condition, downgrade a constraint condition having a reliability less than the predetermined value to a hypothesis, or delete a hypothesis having a reliability less than a predetermined value, it is possible to maintain the reliability of the constraint condition.

Figure 24:
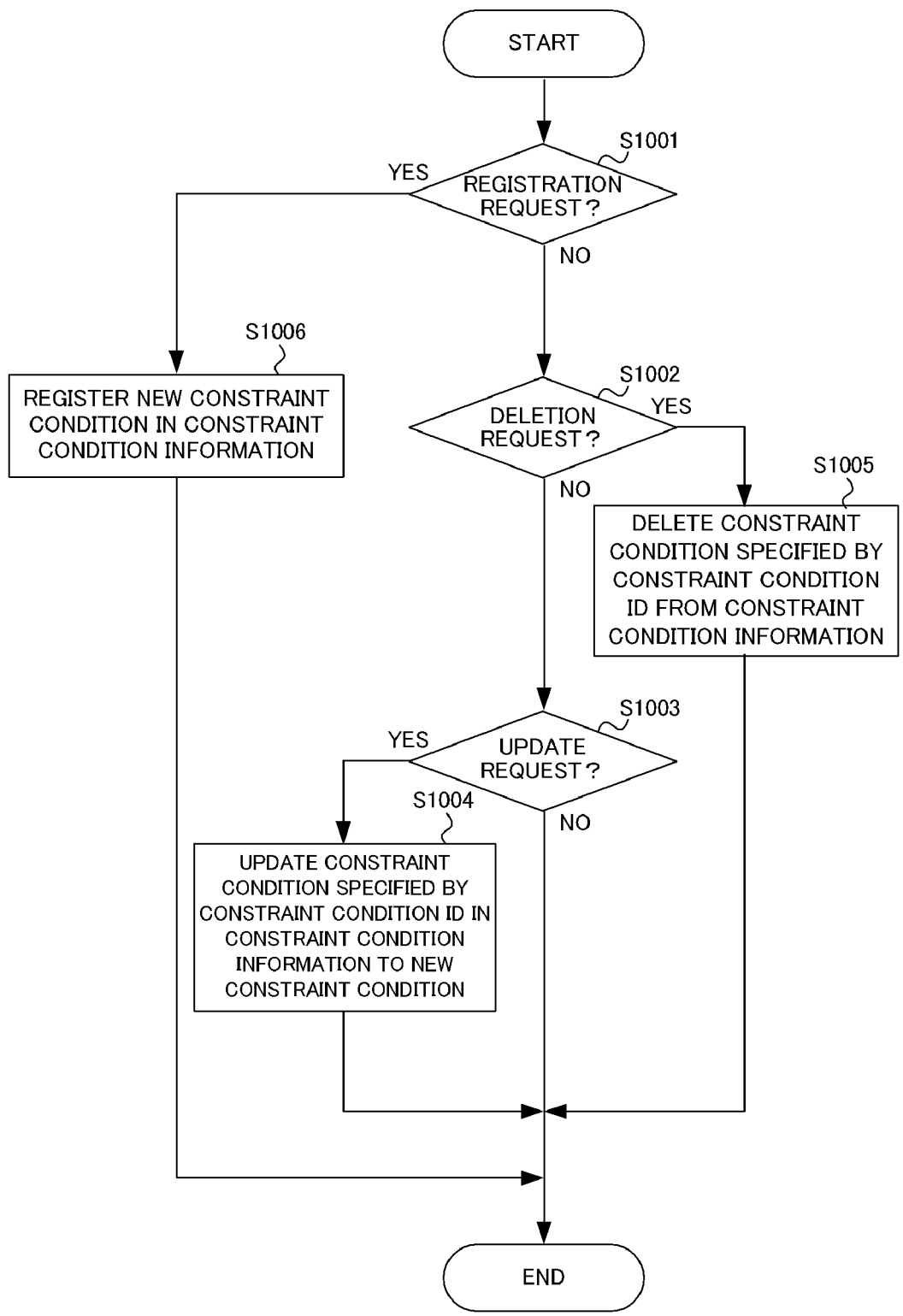
FIG. 24 is a flowchart illustrating operation of a constraint condition management unit.
Figure 25:
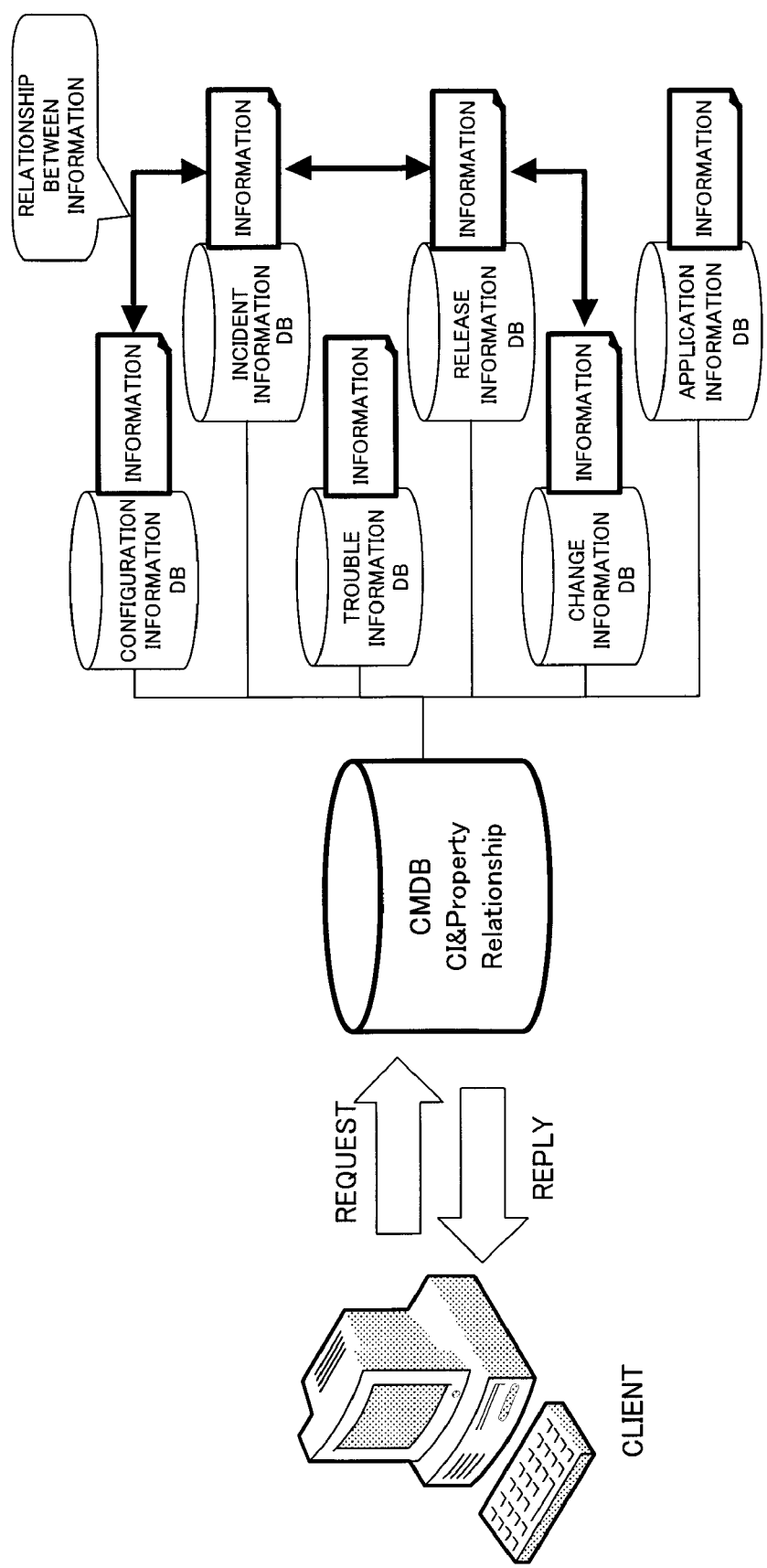
FIG. 25 is a block diagram illustrating a configuration of a conventional CMDB.
Figure 26:
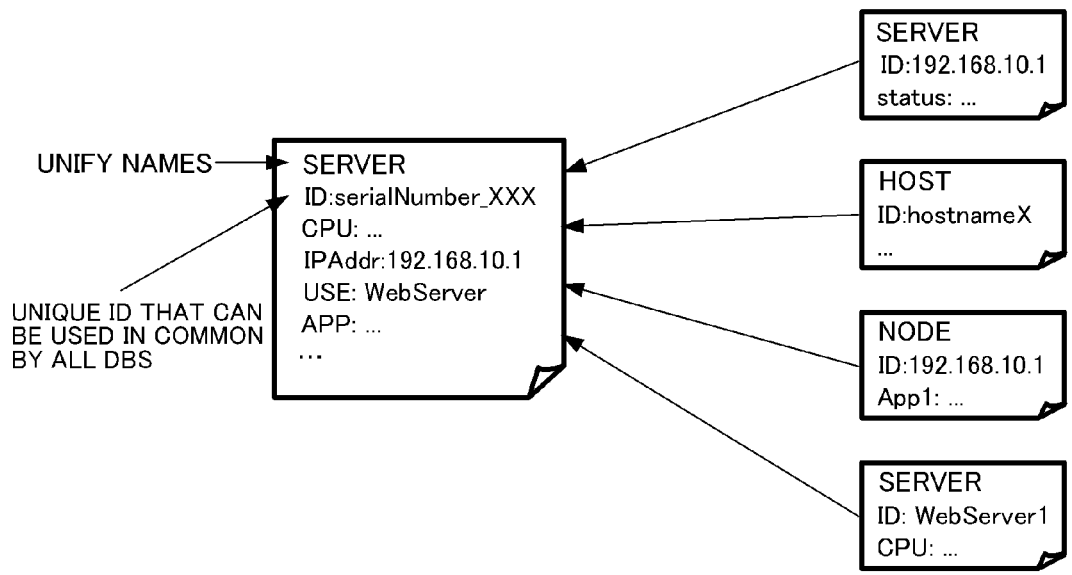
FIG. 26 is a view illustrating a conventional reconciliation function.
Figure 27:
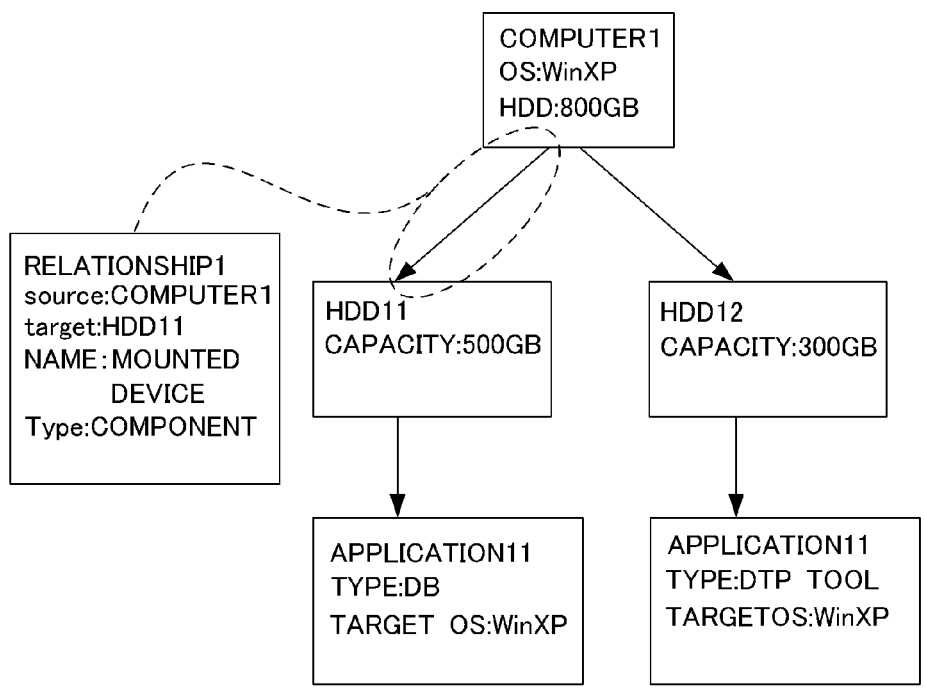
FIG. 27 is a view illustrating a conventional relationship.

Operation of the constraint condition management unit will be described. FIG. 24 is a flowchart illustrating operation of the constraint condition management unit. In this flowchart, it is assumed that the constraint condition management unit has already received a registration, deletion, or update request of a constraint condition from the operation execution unit.

First, the constraint condition management unit 107 determines whether a request issued from the operation execution unit 101 is a constraint condition registration request (S1001).

In the case where the request issued from the operation execution unit 101 is not a constraint condition registration request (NO in S1001), the constraint condition management unit 107 determines whether the request issued from the operation execution unit 101 is a constraint condition deletion request (S1002).

In the case where the request issued from the operation execution unit 101 is not a constraint condition deletion request (NO in S1002), the constraint condition management unit 107 determines whether the request issued from the operation execution unit 101 is a constraint condition update request (S1003).

In the case where the request issued from the operation execution unit 101 is not a constraint condition update request (NO in S1003), the constraint condition management unit 107 ends the processing.

In the case where the request is a constraint condition update request (YES in S1003), the constraint condition management unit 107 updates a constraint condition specified by the constraint condition ID in the constraint condition information to a new constraint condition added in the update request (S1004).

In the case where the request is a constraint condition deletion request in the determination of step S1002 (YES in S1002), the constraint condition management unit 107 deletes a constraint condition specified by the constraint condition ID from the constraint condition information (S1005).

In the case where the request is a constraint condition registration request in the determination of step S1001 (YES in S1001), the constraint condition management unit 107 registers a new constraint condition added in the registration request in the constraint condition information (S1006).

As described above, the constraint condition management unit 107 allows the constraint condition to be manually registered (first condition setting step), deleted, and updated.

Further, in response to the influence investigation request from the client terminal 20, the CMDB 10 according to the present embodiment presents an investigation result including the Entity in which a failure is likely to occur and ground of the determination together with an investigation ID to the client terminal 20.

With the configuration and operation described above, it is possible to obtain a range over which inconsistency is likely to occur due to update of information related to system resources with high accuracy and high efficiency.

The present invention can be embodied in various forms, without departing from the spirit or the main feature. Therefore, the aforementioned embodiment is merely illustrative of the invention in every aspect, and not limitative of the same. The scope of the present invention is defined by the appended claims, and is not restricted by the description herein set forth. Further, various changes and modifications to be made within the scope of the appended claims and equivalents thereof are to fall within the scope of the present invention.

Further, it is possible to provide a program that allows a computer constituting the resource information managing apparatus to execute the above steps as a resource information managing program. By storing the above program in a computer-readable storage medium, it is possible to allow the computer constituting the resource information managing apparatus to execute the program. The computer-readable storage medium mentioned here includes: an internal storage device mounted in a computer, such as ROM or RAM, a portable storage medium such as a CD-ROM, a flexible disk, a DVD disk, a magneto-optical disk, or an IC card; a database that holds computer program; and another computer and database thereof.

According to the present invention, it is possible to determine a range over which inconsistency is likely to occur due to update of information related to system resources with high accuracy and high efficiency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. A resource information managing apparatus that manages a plurality of resource information which is information related to each of a plurality of resources constituting a system, comprising:
  a computer, wherein the computer executes a process comprising:
    setting section that sets first conditions which are predetermined conditions between given resource information and other resource information among the plurality of resources;
    extracting, from the conditions, a first condition regarding changed information that is information indicating a change of a changed resource information among at least one of the resource information to which the selected first condition is set; and
    determining whether the changed information satisfies the first condition,
  wherein the first condition which is set in the given resource information is added with reliability, and the computer further executes:
subtracting a predetermined value from the reliability added to the first condition in the case where it is determined that the changed information does not satisfy the first condition.

2. The resource information managing apparatus according to claim 1, further comprising:
setting, when the resource information selected among the plurality of the resource information is registered or changed, a second conditions which are different from the first condition and added with reliability between updated resource information which is registered or changed resource information and related resource information which is resource information previously associated with the resource information based on the relationship between the related resource information registered or changed and updated resource information;
extracting, from the second conditions, a second condition which is set to the resource information, on which changed information is based;
determining whether the changed information satisfies the second condition
adding a predetermined value to the reliability added to the second condition in the case where it is determined by the second condition determination section that the changed information satisfies the second condition; and
changing the second condition in which the added reliability is not less than a predetermined value to the first condition.

3. The resource information managing apparatus according to claim 2, comprising
changing the first condition in which the added reliability is not more than a predetermined value.

4. The resource information managing apparatus according to claim 2, further comprising:
subtracting a predetermined value from the reliability added to the second condition in the case where it is determined that the changed information does not satisfy the second condition; and
deleting the second condition if the added reliability is not more than a predetermined value.

5. The resource information managing apparatus according to claim 2, wherein
in the case where the updated resource information and related resource information are changed simultaneously, setting a condition that the updated resource information and related resource information are changed simultaneously between the updated resource information and related resource information as the second condition.

6. The resource information processing apparatus according to claim 2, wherein
each of the plurality of the resource information is composed of one or more attribute information, and
in the case where the value of given attribute information of the updated resource information corresponds to the total sum of given attribute information of plurality of related resources,
setting a condition that the value of given attribute information of the updated resource information corresponds to the total sum of given attribute information of plurality of related resources between the updated resource information and related resource information as the second condition.

7. The resource information managing apparatus according to claim 2, wherein
each of the plurality of the resource information is composed of one or more attribute information, and
in the case where given attribute information name of the updated resource information and attribute information name of the related resource at least partially coincide with each other and where attribute information represented by the given attribute information name of the updated resource information and attribute information name of the related resource are values, setting the equality between the value of the attribute information represented by the attribute information name of the updated resource information and value of the attribute information represented by the attribute information name of the related resource information between the updated resource information and related resource information as the second condition.

8. A computer readable, non-transitory medium storing an information processing program that can manage a plurality of resource information which is information related to each of a plurality of resources constituting a system, the program causing a computer to execute a process comprising:
setting predetermined conditions between given resource information and other resource information among the plurality of resources;
extracting, from the conditions which are set, a first condition regarding changed information that is information indicating a change of a changed resource information among at least one of the resource information to which the first condition is set; and
determining whether the changed information satisfies the first condition, wherein
the first condition set in the given resource information is added with reliability, and
the process further comprises:
subtracting a predetermined value from the reliability added to the first condition in the case where the changed information does not satisfy the first condition.

9. The computer readable, non-transitory medium according to claim 8, the process further comprising:
setting, when the resource information selected among the plurality of the resource information is registered or changed, second conditions which are different from the first condition and added with reliability between updated resource information which is registered or changed resource information and related resource information which is resource information previously associated with the resource information based on the relationship between the related resource information registered or changed and updated resource information;
extracting, from the second conditions, a second condition which is set to the resource information, on which changed information is based;
determining whether the changed information satisfies the second condition;
adding a predetermined value to the reliability added to the second condition in the case where the changed information satisfies the second condition; and
changing a second condition in which the added reliability is not less than a predetermined value to the first condition.

10. The computer readable, non-transitory medium according to claim 9, comprising
changing the first condition if the added reliability is not more than a predetermined value to the second condition.

11. The computer readable, non-transitory medium according to claim 9, wherein the process further comprising:
    subtracting a predetermined value from the reliability added to the second condition in the case where the changed information does not satisfy the second condition; and
    deleting the second condition if the added reliability is not more than a predetermined value.

12. The computer readable, non-transitory medium according to claim 9, wherein
    in the case where the updated resource information and related resource information are changed simultaneously, the setting of the second condition sets a condition that the updated resource information and related resource information are changed simultaneously between the updated resource information and related resource information as the second condition.

13. The computer readable, non-transitory medium according to claim 9, wherein
    each of the plurality of the resource information is composed of one or more attribute information, and
    in the case where the value of given attribute information of the updated resource information corresponds to the total sum of given attribute information of plurality of related resources,
    the setting of the second condition sets a condition that the value of given attribute information of the updated resource information corresponds to the total sum of given attribute information of the plurality of related resources between the updated resource information and related resource information as the second condition.

14. The computer readable, non-transitory medium according to claim 9, wherein
    each of the plurality of the resource information is composed of one or more attribute information, and
    in the case where a given attribute information name of the updated resource information and an attribute information name of the related resource at least partially coincide with each other and where attribute information represented by the given attribute information name of the updated resource information and the attribute information name of the related resource are values, the setting of the second condition sets the equality between the value of the attribute information represented by the attribute information name of the updated resource information and value of the attribute information represented by the attribute information name of the related resource information between the updated resource information and related resource information as the second condition.

15. A resource information managing method for managing a plurality of resource information which is information related to each of a plurality of resources constituting a system, comprising:
    setting predetermined conditions between given resource information and other resource information among the plurality of resources;
    extracting, from the first conditions, a first condition set to resource information, on which changed information that is information indicating a change to the resource information is based; and
    determining whether the changed information satisfies the first condition, wherein
    the first condition that is set in the given resource information is added with reliability, and
    the resource information processing method further comprising:
    subtracting a predetermined value from the reliability added to the first condition in the case where the changed information does not satisfy the first condition.

16. The resource information managing method according to claim 15, further comprising:
    setting, when the resource information selected among the plurality of the resource information is registered or changed, a second conditions which are different from the first condition and added with reliability between updated resource information which is registered or changed resource information and related resource information which is resource information previously associated with the resource information based on the relationship between the related resource information registered or changed and updated resource information;
    extracting, from the second conditions, a second condition which is set to the resource information, on which changed information is based;
    determining whether the changed information satisfies the second condition;
    adding a predetermined value to the reliability added to the second condition in the case where the changed information satisfies the second condition; and
    changing the second condition if the added reliability is not less than a predetermined value to the first condition.

17. The resource information managing method according to claim 16, wherein comprising
    changing the first condition in which the added reliability is not more than a predetermined value to the second condition.

18. The resource information managing method according to claim 16, further comprising:
    subtracting a predetermined value from the reliability added to the second condition in the case where the changed information does not satisfy the second condition; and
    deleting the second condition if the added reliability is not more than a predetermined value.

19. The resource information managing method according to claim 16, wherein
    in the case where the updated resource information and related resource information are changed simultaneously, the setting of the second condition sets a condition that the updated resource information and related resource information are changed simultaneously between the updated resource information and related resource information as the second condition.

20. The resource information managing method according to claim 16, wherein
    each of the plurality of the resource information is composed of one or more attribute information, and
    in the case where the value of given attribute information of the updated resource information corresponds to the total sum of given attribute information of plurality of related resources,
    the setting of the second condition sets a condition that the value of given attribute information of the updated resource information corresponds to the total sum of given attribute information of the plurality of related resources between the updated resource information and related resource information as the second condition.

* * * * *